US012628015B2

(12) United States Patent
Jin et al.

(10) Patent No.: US 12,628,015 B2
(45) Date of Patent: May 12, 2026

(54) METHOD AND APPARATUS FOR DYNAMICALLY UPDATING BEAM FAILURE DETECTION RESOURCE OF TRP IN WIRELESS COMMUNICATION SYSTEM

(71) Applicant: Samsung Electronics Co., Ltd., Suwon-si (KR)

(72) Inventors: Seungri Jin, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 18/297,369

(22) Filed: Apr. 7, 2023

(65) Prior Publication Data
US 2023/0328561 A1 Oct. 12, 2023

(30) Foreign Application Priority Data
Apr. 12, 2022 (KR) ........................ 10-2022-0045355

(51) Int. Cl.
*H04W 24/08* (2009.01)
*H04W 56/00* (2009.01)
*H04W 76/20* (2018.01)

(52) U.S. Cl.
CPC ....... *H04W 24/08* (2013.01); *H04W 56/0015* (2013.01); *H04W 76/20* (2018.02)

(58) Field of Classification Search
CPC .. H04W 24/08; H04W 56/0015; H04W 76/20
See application file for complete search history.

(56) References Cited

U.S. PATENT DOCUMENTS

| | | | |
|---|---|---|---|
| 2019/0268790 A1 | 8/2019 | Kwon et al. | |
| 2020/0383167 A1* | 12/2020 | Sengupta | H04W 76/19 |
| 2022/0046438 A1 | 2/2022 | Lo et al. | |
| 2022/0078872 A1 | 3/2022 | Shrestha et al. | |
| 2022/0085862 A1 | 3/2022 | Kung et al. | |

(Continued)

FOREIGN PATENT DOCUMENTS

| | | |
|---|---|---|
| EP | 4 064 583 A1 | 9/2022 |
| WO | 2021/107575 A1 | 6/2021 |

OTHER PUBLICATIONS

European Search Report dated May 15, 2024, issued in European Patent Application No. 23726449.4.

(Continued)

*Primary Examiner* — Brian P Cox
(74) *Attorney, Agent, or Firm* — Jefferson IP Law, LLP

(57) ABSTRACT

A method performed by a user equipment (UE) in a wireless communication system is provided. The method includes receiving, from a base station (BS) via a radio resource control (RRC) message, configuration information including information on a first beam failure detection (BFD)-reference signal (RS) set and information on a second BFD-RS set, wherein each of the first BFD-RS set and the second BFD-RS set includes a plurality of BFD-RS resources, receiving, from the BS, medium access control (MAC) control element (CE) including information for indicating a first at least one BFD-RS resource included in the first BFD-RS set and a second at least one BFD-RS resource included in the second BFD-RS set, and identifying one or more activated BFD-RSs based on the MAC CE.

14 Claims, 14 Drawing Sheets

(56) References Cited

U.S. PATENT DOCUMENTS

| | | | | |
|---|---|---|---|---|
| 2022/0109489 A1* | 4/2022 | Zhu | ........................ | H04L 1/1614 |
| 2022/0109547 A1* | 4/2022 | Svedman | .............. | H04L 5/0053 |
| 2024/0291547 A1* | 8/2024 | Matsumura | ............ | H04B 7/088 |

OTHER PUBLICATIONS

Moderator (CATT), 'Summary of enhancements on beam management for multi-TRP (Round 2)', R1-2112644, 3GPP TSG RAN WG1 #107-e, e-Meeting, Nov. 20, 2021.
International Search Report dated Jun. 29, 2023, issued in International Patent Application No. PCT/KR2023/004746.

* cited by examiner

Case 1: Cell level BFD/BFR

Case 2: TRP level BFD/BFR

METHOD AND APPARATUS FOR DYNAMICALLY UPDATING BEAM FAILURE DETECTION RESOURCE OF TRP IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0045355, filed on Apr. 12, 2022, in the Korean Intellectual Property Office, the disclosure of which is incorporated by reference herein in its entirety.

BACKGROUND

1. Field

The disclosure relates to a method and apparatus for dynamically updating a beam failure detection resource of a Transmission Reception Point (TRP) in a wireless communication system. More particularly, the disclosure relates to a method and apparatus for configuring information on a beam resource of a plurality of TRPs in a wireless communication system, and dynamically updating a beam failure detection resource based on this.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter-wave (mm-Wave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input and Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step Random-Access Channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

As described above, with the development of the wireless communication system, there is a need for a method in which a time required until eXtended Reality (XR) data for providing an XR service to a user is transferred to each XR device through a 5th Generation (5G) system is controlled within an allowable delay time to provide a network with a Quality of Service (QoS) and policy for transmitting (a plurality of pieces of) XR data to enable a service capable of improving user experience of the XR service, that is, a multi-modality service.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus capable of smoothly providing efficiency of a service in a wireless communication system.

Another aspect of the disclosure is to provide a method and apparatus in which, in order for a wireless communication system using a beam to support a beam failure detection in a plurality of Transmission Reception Points (TRPs), information on a beam resource transferred from the TRP is configured for a User Equipment (UE), and the resource is monitored. In addition, the disclosure provides a method and apparatus for configuring or updating a resource for beam failure detection of the plurality of TRPs.

Additional aspects will be set forth in part in the description which follows and, in part, will be apparent from the description, or may be learned by practice of the presented embodiments.

In accordance with an aspect of the disclosure, a method performed by a User Equipment (UE) in a wireless communication system is provided. The method includes receiving, from a base station (BS) via a radio resource control (RRC) message, configuration information including information on a first beam failure detection (BFD)-reference signal (RS) set and information on a second BFD-RS set, wherein each of the first BFD-RS set and the second BFD-RS set includes a plurality of BFD-RS resources, receiving, from the BS, medium access control (MAC) control element (CE) including information for indicating a first at least one BFD-RS resource included in the first BFD-RS set and a second at least one BFD-RS resource included in the second BFD-RS set, and identifying one or more activated BFD-RSs based on the MAC CE.

In accordance with another aspect of the disclosure, a method performed by a BS in a wireless communication system is provided. The method includes transmitting, to a user equipment (UE), via a radio resource control (RRC) message, configuration information including information on a first beam failure detection (BFD)-reference signal (RS) set and information on a second BFD-RS set, wherein each of the first BFD-RS set and the second BFD-RS set includes a plurality of BFD-RS resources, identifying a medium access control (MAC) control element (CE) associated with one or more BFD-RS resources to be activated, and transmitting, to the UE, the MAC CE including information for indicating a first at least one BFD-RS resource included in the first BFD-RS set and a second at least one BFD-RS resource included in the second BFD-RS set.

In accordance with another aspect of the disclosure, a UE in a wireless communication system is provided. The UE includes at least one transceiver and at least one processor operatively coupled to the at least one transceiver. The at least one processor may be configured to receive, from a base station (BS) via a radio resource control (RRC) message, configuration information including information on a first beam failure detection (BFD)—reference signal (RS) set and information on a second BFD-RS set, wherein each of the first BFD-RS set and the second BFD-RS set includes a plurality of BFD-RS resources, receive, from the BS, medium access control (MAC) control element (CE) including information for indicating a first at least one BFD-RS resource included in the first BFD-RS set and a second at least one BFD-RS resource included in the second BFD-RS set, and identify one or more activated BFD-RSs based on the MAC, and transmit information on the BFR to the BS, based on the monitoring result.

In accordance with another aspect of the disclosure, a BS in a wireless communication system is provided. The BS includes at least one transceiver and at least one processor operatively coupled to the at least one transceiver. The at least one processor may be configured to transmit, to a user equipment (UE), via a radio resource control (RRC) message, configuration information including information on a first beam failure detection (BFD)-reference signal (RS) set and information on a second BFD-RS set, wherein each of the first BFD-RS set and the second BFD-RS set includes a plurality of BFD-RS resources, identify a medium access control (MAC) control element (CE) associated with one or more BFD-RS resources to be activated, and transmit, to the UE, the MAC CE including information for indicating a first at least one BFD-RS resource included in the first BFD-RS set and a second at least one BFD-RS resource included in the second BFD-RS set.

Various embodiments of the disclosure may provide an apparatus and method capable of effectively providing a service in a wireless communication system.

According to various embodiments of the disclosure, since a wireless communication system supports a method of configuring and dynamically updating a resource for beam failure detection of a plurality of Transmission Reception Points (TRPs) through Radio Resource Control (RRC) and Medium Access Control (MAC) Control Element (CE), a User Equipment (UE) is capable of adaptively changing and applying the beam failure detection of the plurality of TRPs according to a channel situation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
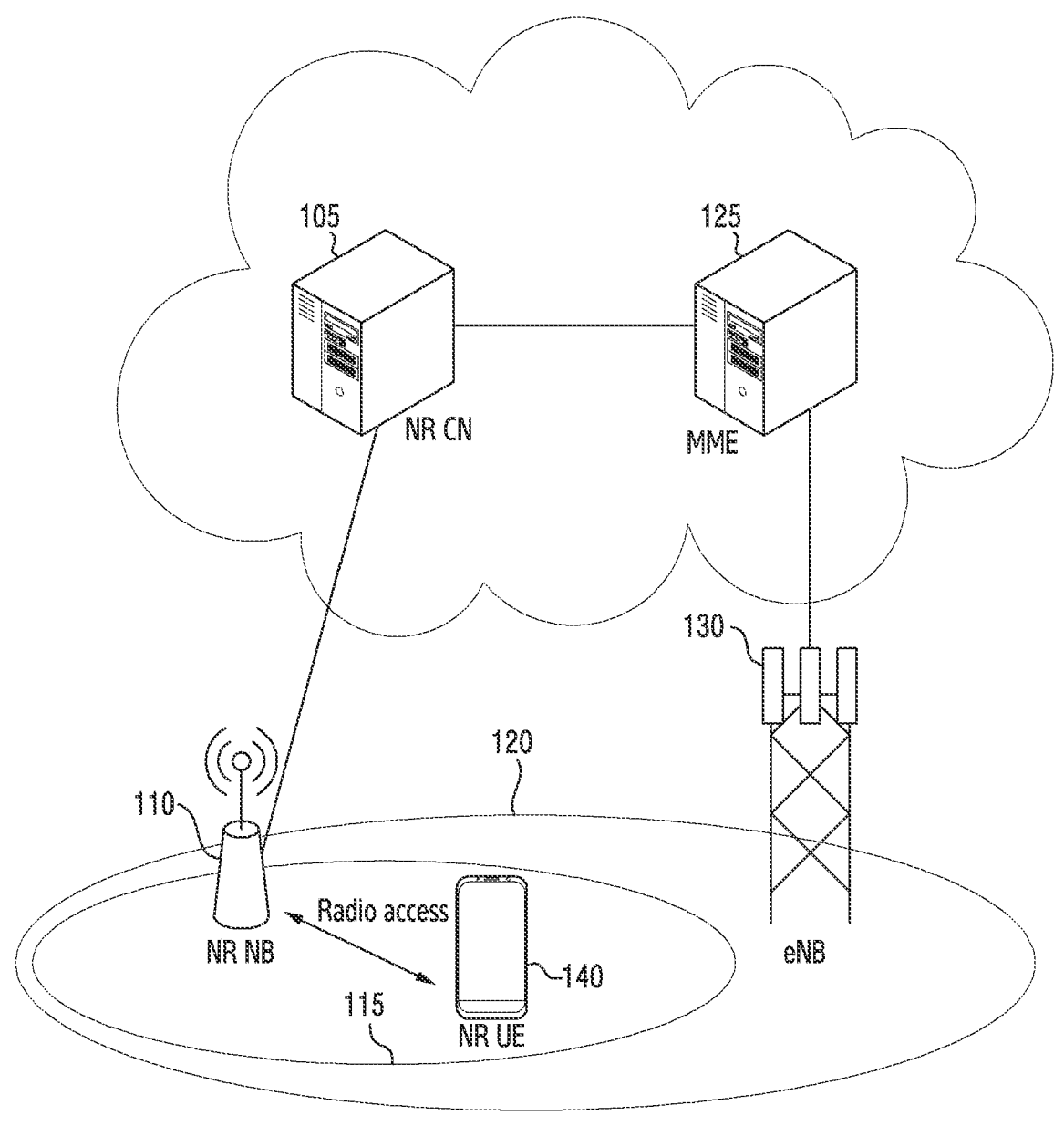
FIG. 1 illustrates a structure of a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are for the purpose of describing particular embodiments only and are not intended to limit other embodiments. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Embodiments of the disclosure will be described herein below with reference to the accompanying drawings. In the following description, well-known functions or constructions are not described in detail when they would obscure the disclosure in unnecessary detail. Also, the terms used herein are defined according to the functions of the disclosure. Thus, the terms may vary depending on a user's or operator's intention and usage. Therefore, the terms used herein may be understood based on the descriptions made herein. In the following description, a term for identifying an access node, terms referring to network entities, terms referring to messages, a term referring to an interface between network entities, terms referring to various pieces of identification information, or the like are exemplified for convenience of explanation. Therefore, without being limited to the terms used in the disclosure, other terms having equivalent technical meanings may also be used.

Hereinafter, for convenience of explanation, terms and names defined in the 3rd Generation Partnership Project (3GPP) Long Term Evolution (LTE) standard are used in the disclosure. However, the disclosure is not limited to the terms and names, and is also equally applied to a system conforming to other standards.

FIG. 1 illustrates a structure of a wireless communication system according to an embodiment of the disclosure.

Referring to FIG. 1, a radio access network of the wireless communication system may be constructed of a New Radio Node B (NR NB) 110 providing coverage 115 and a New Radio Core Network (NR CN) or Next Generation Core Network (NG CN) 105. A New Radio User Equipment (NR UE) 140 may have access to an external network via the NR NB 110 and the NR CN 105.

Referring to FIG. 1, the NR NB 110 may correspond to an evolved Node B (eNB) of the existing LTE system. The NR NB 110 may be coupled to the NR UE 140 through a radio channel and may provide a service superior to the existing node B. In the next-generation communication system, since every user traffic is served through a shared channel, a device for performing scheduling by collecting state information of UEs 140 such as a buffer state, an available transmit power state, a channel state, or the like may be required, and the NR NB 110 may be responsible for this. In general, one NR NB 110 may control a plurality of cells. At least the existing maximum bandwidth may be used to implement high-speed data transmission compared to the existing LTE, and a beamforming technique may be additionally used with Orthogonal Frequency Division Multiplexing (OFDM) as a radio access technology. In addition, an Adaptive Modulation & Coding (AMC) scheme which determines a modulation scheme and a channel coding rate may be applied, based on the channel state of the UE. The NR CN 105 may perform a function of mobility support, bearer configuration, QoS configuration, or the like. The NR CN 105 may be coupled to a plurality of base stations (BSs), as a device in charge of various control functions as well as a mobility management function for the UE. In addition, the next-generation mobile communication system may also interwork with the existing LTE system. The NR CN 105 may be coupled to the Mobility Management Entity (MME) 125 through a network interface, and the MME 125 is coupled to the eNB 130 which is the existing BS providing coverage 120.

Figure 2A:
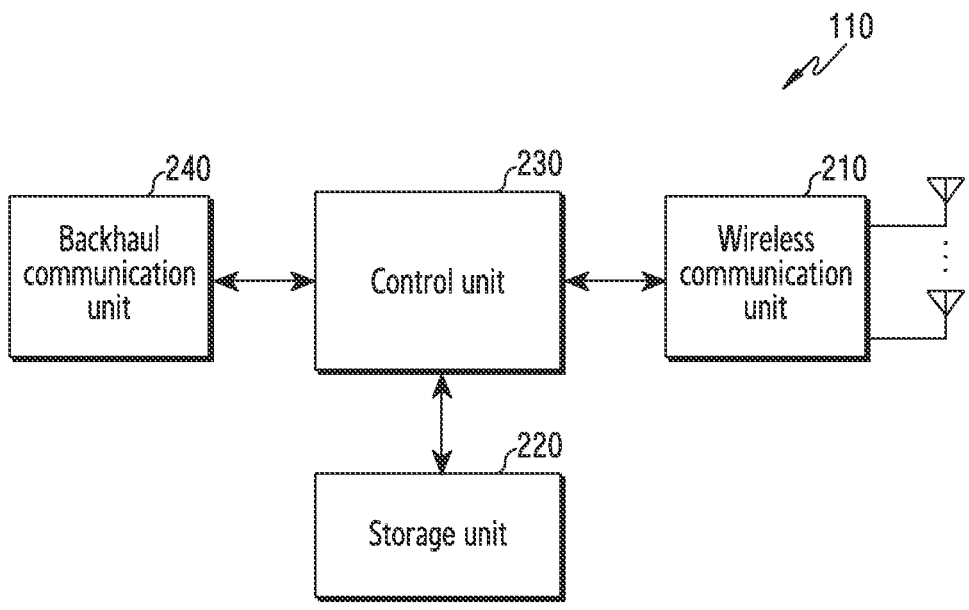
FIG. 2A illustrates a structure of a Base Station (BS) in a wireless communication system according to an embodiment of the disclosure.

FIG. 2A illustrates a structure of a BS in a wireless communication system according to an embodiment of the disclosure.

The structure of FIG. 2A may be understood as a structure of the NR NB 110. Hereinafter, the term ' . . . unit', ' . . . device', or the like implies a unit of processing at least one function or operation, and may be implemented in hardware or software or in combination of the hardware and the software.

Referring to FIG. 2A, the BS includes a wireless communication unit 210, a backhaul communication unit 240, a storage unit 220, and a control unit 230.

The wireless communication unit 210 performs functions for transmitting and receiving a signal through a radio channel. For example, the wireless communication unit 210 performs a function of conversion between a baseband signal and a bit-stream according to a physical layer standard of a system. For example, in data transmission, the wireless communication unit 210 generates complex symbols by coding and modulating a transmission bit-stream. In addition, in data reception, the wireless communication unit 210 restores a received bit-stream by demodulating and decoding a baseband signal.

In addition, the wireless communication unit 210 up-converts a baseband signal into a Radio Frequency (RF) signal and thereafter transmits it through an antenna, and down-converts an RF signal received through the antenna into a baseband signal. For this, the wireless communication unit 210 may include a transmission filter, a reception filter, an amplifier, a mixer, an oscillator, a Digital to Analog Converter (DAC), an Analog to Digital Converter (ADC), or the like. In addition, the wireless communication unit 210 may include a plurality of transmission/reception paths. Further, the wireless communication unit 210 may include at least one antenna array constructed of a plurality of antenna elements.

From a hardware aspect, the wireless communication unit 210 may be constructed of a digital unit and an analog unit. The analog unit may be constructed of a plurality of sub-units according to operating power, operating frequency, or the like. The digital unit may be implemented with at least one processor (e.g., a Digital Signal Processor (DSP)).

The wireless communication unit 210 transmits and receives a signal as described above. Accordingly, the entirety or part of the wireless communication unit 210 may be referred to as a 'transmitter', a 'receiver', or a 'transceiver'. In addition, in the following description, transmission and reception performed through a radio channel are used to imply that the aforementioned processing is performed by the wireless communication unit 210.

The backhaul communication unit 240 provides an interface for performing communication with other nodes in a network. That is, the backhaul communication unit 240 may convert a bitstream transmitted from a BS to another node, for example, another access node, another BS, a higher node, a core network, or the like into a physical signal, and may convert a physical signal received from another node into a bitstream.

The storage unit 220 stores data such as a basic program, application program, configuration information, or the like for an operation of the BS. The storage unit 220 may be constructed of a volatile memory, a non-volatile memory, or a combination of the volatile memory and the non-volatile memory. In addition, the storage unit 220 may provide the stored data according to a request of the control unit 230.

The control unit 230 controls overall operations of the BS. For example, the control unit 230 transmits and receives a signal via the wireless communication unit 210 or via the backhaul communication unit 240. In addition, the control unit 230 writes data to the storage unit 220 and reads the data. Further, the control unit 230 may perform functions of a protocol stack required in a communication standard. According to another implementation, the protocol stack may be included in the wireless communication unit 210. To this end, the control unit 230 may include at least one processor. According to various embodiments, the control unit 230 may provide control to perform synchronization using a wireless communication network. For example, the control unit 230 may control the BS to perform operations according to various embodiments described below.

Figure 2B:
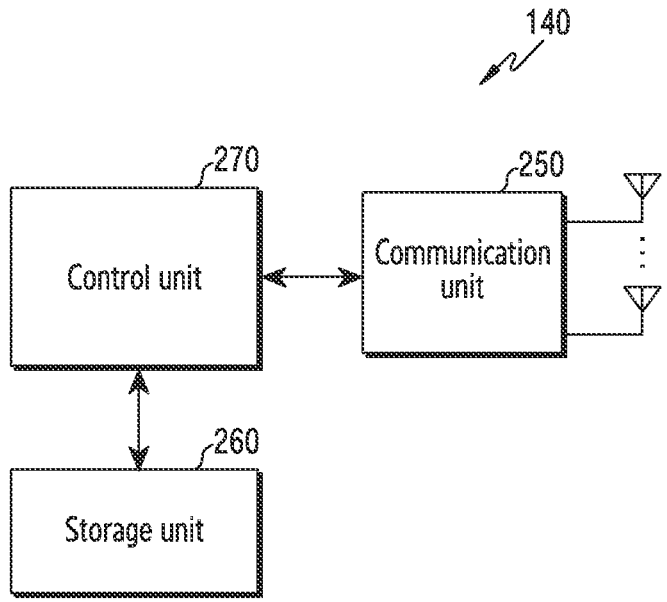
FIG. 2B illustrates a structure of a User Equipment (UE) in a wireless communication system according to an embodiment of the disclosure.

FIG. 2B illustrates a structure of a UE in a wireless communication system according to an embodiment of the disclosure.

The structure exemplified in FIG. 2B may be understood as a structure of the UE 140. Hereinafter, the term ' . . . unit', ' . . . device', or the like implies a unit of processing at least one function or operation, and may be implemented in hardware or software or in combination of the hardware and the software.

Referring to FIG. 2B, the UE includes a communication unit 250, a storage unit 260, and a control unit 270.

The communication unit 250 performs functions for transmitting and receiving a signal through a radio channel. For example, the communication unit 250 performs a function of conversion between a baseband signal and a bit-stream according to a physical layer standard of a system. For example, in data transmission, the communication unit 250 generates complex symbols by coding and modulating a transmission bit-stream. In addition, in data reception, the communication unit 250 restores a received bit-stream by demodulating and decoding a baseband signal. In addition, the communication unit 250 up-converts a baseband signal into a Radio Frequency (RF) signal and thereafter transmits it through an antenna, and down-converts an RF signal received through the antenna into a baseband signal. For example, the communication unit 250 may include a transmission filter, a reception filter, an amplifier, a mixer, an oscillator, a Digital to Analog Converter (DAC), an Analog to Digital Converter (ADC), or the like.

In addition, the communication unit 250 may include a plurality of transmission/reception paths. Further, the communication unit 250 may include at least one antenna array constructed of a plurality of antenna elements. From a hardware aspect, the communication unit 250 may be constructed of a digital unit and an analog unit (e.g., a Radio Frequency Integrated Circuit (RFIC)). Herein, the digital circuit and the analog unit may be implemented as one package. In addition, the communication unit 250 may include a plurality of RF chains. Further, the communication unit 250 may perform beamforming.

The communication unit 250 transmits and receives a signal as described above. Accordingly, the entirety or part of of the communication unit 250 may be referred to as a 'transmitter', a 'receiver', or a 'transceiver'. In addition, in the following description, transmission and reception performed through a radio channel are used to imply that the aforementioned processing is performed by the communication unit 250.

The storage unit 260 stores data such as a basic program, application program, configuration information, or the like for an operation of the UE. The storage unit 260 may be constructed of a volatile memory, a non-volatile memory, or a combination of the volatile memory and the non-volatile memory. In addition, the storage unit 260 provides the stored data according to a request of the control unit 270.

The control unit 270 controls overall operations of the UE. For example, the control unit 270 transmits and receives a signal via the communication unit 250. In addition, the control unit 270 writes data to the storage unit 260 and reads the data. Further, the control unit 270 may perform functions of a protocol stack required in a communication standard. To this end, the control unit 270 may include at least one processor or micro-processor, or may be part of the processor. In addition, part of the communication unit 250 and the control unit 270 may be referred to as a Communication Processor (CP). According to various embodiments, the control unit 270 may provide control to perform synchronization using a wireless communication network. For example, the control unit 270 may control the UE to perform operations according to various embodiments described below.

Figure 3:
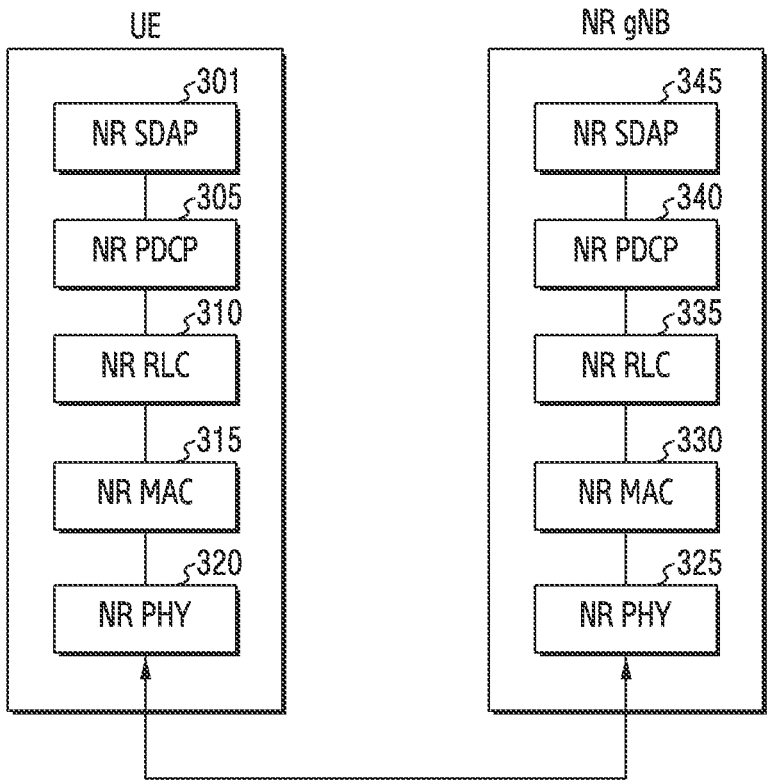
FIG. 3 illustrates a radio protocol structure in a wireless communication system according to an embodiment of the disclosure.

FIG. 3 illustrates a radio protocol structure in a wireless communication system according to an embodiment of the disclosure.

Referring to FIG. 3, a radio protocol of the wireless communication system may include New Radio Service Data Adaptation Protocols (NR SDAPs) 301 and 345, NR Packet Data Convergence Protocols (NR PDCPs) 305 and 340, NR Radio Link Controls (NR RLCs) 310 and 335, and NR Medium Access Controls (NR MACs) 315 and 330.

A main function of the NR SDAPs 301 and 345 may include some of the following functions.

1. User data transfer function (transfer of user plane data)
2. QoS flow and data bearer mapping function for uplink and downlink (mapping between a QoS flow and a Data Radio Bearer (DRB) for both Downlink (DL) and Uplink (UL))
3. QoS flow Identifier (ID) marking function for uplink and downlink (marking QoS flow ID in both DL and UL packets)
4. Function of mapping reflective QoS flow to data bearer for uplink SDAP Protocol Data Unit (PDUs) (reflective QoS flow to DRB mapping for the UL SDAP PDUs)

For an SDAP layer device, whether to use a header of the SDAP layer device may be configured for the UE with an RRC message for each PDCP layer device or for each bearer or for each logical channel. In addition, whether to use the SDAP layer device may be configured for the UE. When the SDAP header is configured for the UE, a Non-Access Stratum (NAS) reflective Quality of Service (QoS) setup 1-bit indicator of the SDAP header and an Access Stratum (AS) reflective QoS setup 1-bit indicator may instruct the UE to update or reconfigure mapping information for a QoS flow and data bearer for an uplink and a downlink. The SDAP header may include QoS flow ID information indicating QoS. The QoS information may be used as data processing priority, scheduling information, or the like to smoothly support services.

A main function of the NR PDCPs 305 and 340 may include some of the following functions.

1. Header compression and decompression function (Header compression and decompression: Robust Header Compression (ROHC) only
2. User data transfer function (Transfer of user data)
3. In-sequence delivery function (In-sequence delivery of upper layer PDUs)
4. Out-of-sequence delivery function (Out-of-sequence delivery of upper layer PDUs)
5. Reordering function (PDCP PDU reordering for reception)
6. Duplication detection function (Duplicate detection of lower layer Service Data Units (SDUs))
7. Retransmission function (Retransmission of PDCP SDUs)
8. Ciphering and deciphering function (Ciphering and deciphering)
9 Timer-based SDU discarding function (Timer-based SDU discard in uplink)

The reordering function of the NR PDCP device implies a function of reordering PDCP PDUs received from a lower layer, in sequence, based on a PDCP Sequence Number (SN). The NR PDCP device may include a function of delivering data to a higher layer in a reordered sequence. The NP PDCP device may include a function of directly delivering the data without considering the order. The NR PDCP device may include a function of recording lost PDCP PDUs through reordering. The NR PDCP device may include a function of reporting a state for the lost PDCP PDUs to a transmitting side, and may include a function of requesting for transmission of the lost PDCP PDUs.

A main function of the NR RLCs 310 and 335 may include some of the following functions.

1. Data transfer function (Transfer of upper layer PDUs)
2. In-sequence delivery function (In-sequence delivery of upper layer PDUs)
3. Out-of-sequence delivery function (Out-of-sequence delivery of upper layer PDUs)
4. Automatic Repeat Request (ARQ) function (Error Correction through ARQ)
5. Concatenation, segmentation, and reassembly function (Concatenation, segmentation and reassembly of RLC SDUs)
6. Re-segmentation function (Re-segmentation of RLC data PDUs)
7. Reordering function (Reordering of RLC data PDUs)
8. Duplication detection function (Duplicate detection)
9. Error detection function (Protocol error detection)
10. RLC SDU discarding function (RLC SDU discard)
11. RLC re-establishment function (RLC re-establishment)

The in-sequence delivery function of the NR RLC device may imply a function of sequentially delivering RLC SDUs received from a lower layer to a higher layer. When one RLC SDU is originally received by being segmented into several RLC SDUs, the NR RLC device may include a function of reassembling and delivering the segmented RLC SDUs. The NR RLC device may include a function of reordering the received RLC PDUs according to an RLC Sequence Number (SN) or a PDCP SN. The NR RLC device may include a function of recording lost RLC PDUs through reordering. The NR RLC device may include a function of reporting a state for the lost PDCP PDUs to a transmitting side, and may include a function of requesting for transmission of the lost PDCP PDUs. The NR RLC device may include a function in which, when there is a lost RLC SDU, only RLC SDUs ahead of the lost RLC SDU are delivered in sequence to a higher layer. The NR RLC device may include a function in which, when a specific timer expires even if the lost RLC SDU exists, all RLC SDUs received before the timer starts are delivered in sequence to the higher layer, and may include a function in which, when the specific timer expires even if the lost RLC SDU exists, all RLC SDUs received up to now are delivered in sequence to the higher layer. In addition, the NR RLC device may process the RLC PDUs in the order by which the RLC PDUs are received (in the order by which the RLC PDUs are arrived irrespective of the order of sequence numbers) and deliver the RLC PDUs to a PDCP device irrespective of the order (i.e., out-of-sequence delivery). In case of a segment, the NR RLC device may receive segments stored in a buffer or to be received at a later time and reconstruct the segments into one RLC PDU and then process and deliver the RLC PDU to the PDCP device. The NR RLC layer may not include a concatenation function. The concatenation function may be performed in an NR MAC layer or may be replaced with a multiplexing function of an NR MAC layer. The out-of-sequence delivery function of the NR RLC device may imply a function of delivering RLC SDUs received from a lower layer directly to a higher layer irrespective of the order. When one RLC SDU is originally received by being segmented into several RLC SDUs, the NR RLC device may include a function of reassembling and delivering the segmented RLC SDUs. The NR RLC device may include a function of recording lost RLC PDUs by storing and ordering an RLC SN or PDCP SN of the received RLC PDUs.

The NR MACs 315 and 330 may be coupled to several NR RLC layer devices constructed in one UE, and a main function of the NR MAC may include some of the following functions.

1. Mapping function between logical channel and transport channel (Mapping between logical channels and transport channels)
2. Multiplexing and demultiplexing function of MAC SDUs (Multiplexing and demultiplexing function (Multiplexing/demultiplexing of MAC SDUs)
3. Scheduling information reporting function (Scheduling information reporting)
4. Hybrid Automatic Repeat and ReQuest (HARQ) function (Error correction through HARQ)
5. Priority handling function between logical channels (Priority handling between logical channels of one UE)
6. Priority handling function between UEs (Priority handling between UEs by means of dynamic scheduling)
7. Multimedia Broadcast and Multicast Service (MBMS) service Identification function
8. Transport format selection function (Transport format selection)
9. Padding function (Padding)

NR Physical (PHY) layers 320 and 325 may perform channel coding and modulation on higher layer data. The NR PHY layer may perform an operation in which an OFDM symbol is created and transmitted through a radio channel or in which demodulation and channel coding are performed on the OFDM symbol received through the radio channel and then are delivered to a higher layer.

Figure 4:
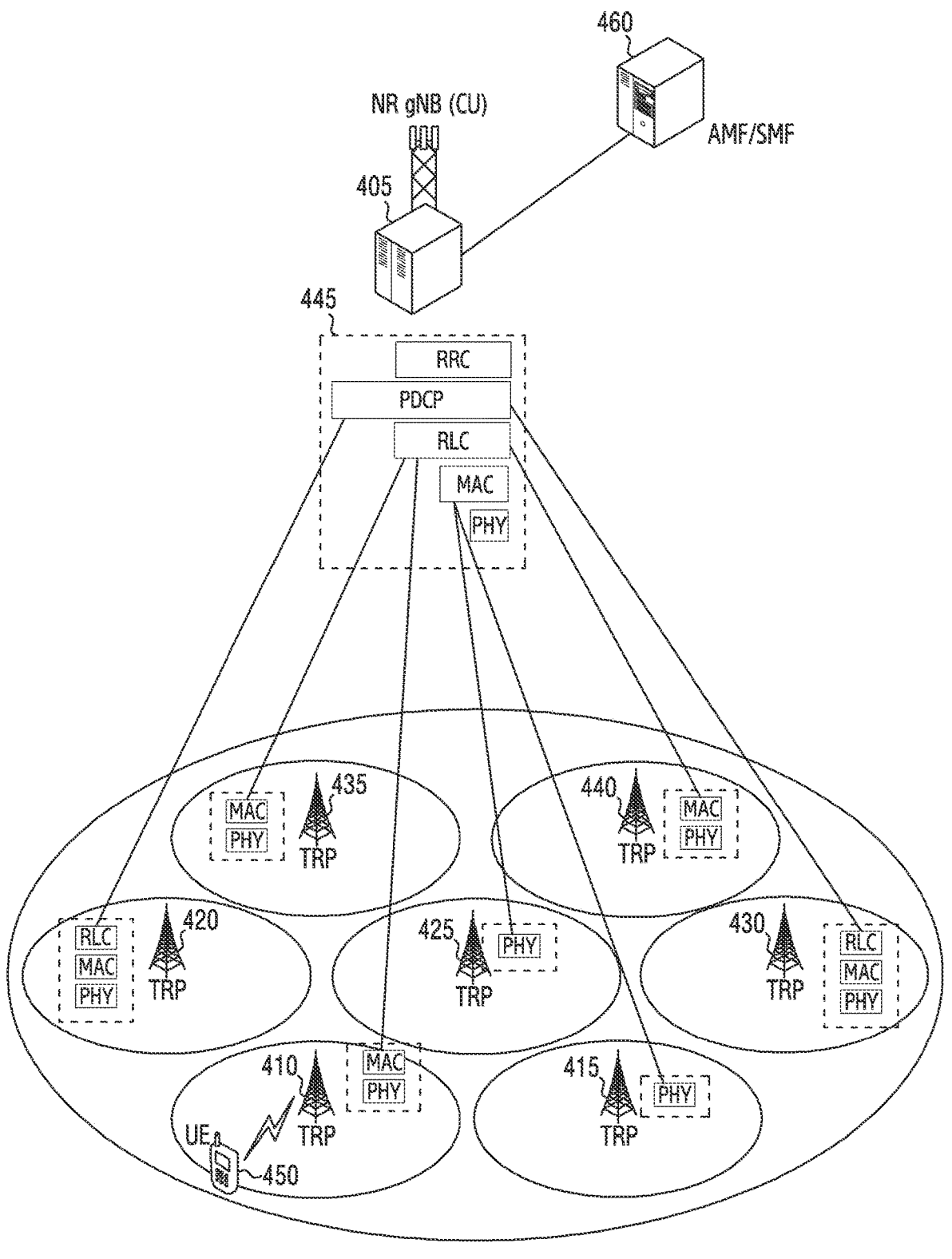
FIG. 4 illustrates a structure of a wireless communication system including a plurality of Transmission Reception Points (TRPs) in the wireless communication system according to an embodiment of the disclosure.

FIG. 4 illustrates a structure of a wireless communication system including a plurality of Transmission Reception Points (TRPs) in the wireless communication system according to an embodiment of the disclosure.

Referring to FIG. 4, a cell served by an NR gNB 405 operating on a beam basis may be constructed of multiple TRPs 410, 415, 420, 425, 430, 435, and 440. The TRPs 410 to 440 represent blocks in which some functions of transmitting and receiving a physical signal are separated from the legacy NR eNB, and are constructed of a plurality of antennas. The NR gNB 405 may also be represented by a Central Unit (CU), and the TRP may also be represented as a Distributed Unit (DU). A function of the NR gNB 405 may be configured by separating each layer from a layer such as a PDCP/RLC/MAC/PHY layer 445. The TRPs 415 and 425 may have only the PHY layer and perform a function of that layer. The TRPs 410, 435, and 440 may have only the PHY layer and the MAC layer and perform functions of those layers. The TRPs 420 and 430 may have only the PHY layer, the MAC layer, and the RLC layer and perform functions of those layers. The TRPs 410 to 440 may use a beamforming technology in which narrow beams are generated in various directions by using a plurality of transmission/reception antennas to transmit and receive data. A UE 450 may access the NR gNB 405 and an external network through the TRPs 410 to 440. The NR gNB 405 may perform scheduling by collecting state information of the UEs such as a buffer state, an available transmit power state, a channel state, or the like to provide a service to users. The NR gNB 405 may support connectivity between UEs and a Core Network (CN), in particular, an AMF/SMF 460.

According to various embodiments of the disclosure, the following description is based on structures 415 and 425 in which the TRP has only the PHY layer and performs a function of the layer.

In order to improve efficiency of a Multiple-Input and Multiple-Output (MIMO) operation in a wireless communication system, a method of measuring and reporting a plurality of beams, a method of selecting a best beam to be used in data transmission and reception, a method of measuring and recovering a beam failure on a beam in use, or the like is required in a Frequency Range 2 (FR2) which uses a beam in transmission.

Hereinafter, the disclosure additionally describes specific operations, based on the aforementioned methods. In particular, a method of improving an operation related to Beam Failure Detection (BFD) and Beam Failure Recovery (BFR) will be described. The conventional BFD/BFR operation may be divided into a BFR operation and a Secondary Cell (SCell) BFR operation. The two methods may have a common feature in a sense that a cell-specific BFD/BFR operation is performed. The two methods may be different in that a subsequent operation differs depending on at which cell the BFD/BFR operation occurs. A difference between the two methods may be summarized as follows.

1. SCell BFR

When BFD occurs in a specific SCell, a UE delivers a BFR MAC CE through an uplink resource When the uplink resource for delivering the BFR MAC CE is not sufficient, a Scheduling Request (SR) for BFR transmission is triggered (an SR configuration and a Physical Uplink Control Channel (PUCCH) resource are configured by a BS on a cell group basis)

BFR MAC CE configuration: It is at least one of information on SCell(s) in which a beam failure occurs, an indicator indicating whether a candidate beam is present, and a candidate beam identifier The BFR procedure is complete upon receiving a Physical Downlink Control Channel (PDCCH) addressed with a Cell-Radio Network Temporary Identifier (C-RNTI)

2. SpCell BFR

When BFD occurs in an SpCell, a UE triggers a random access procedure, and delivers msgA or msg3 by including a BFR MAC CE BFR MAC CE configuration: It is at least one of an SpCell beam failure occurrence identifier, an indicator indicating whether a candidate beam is present, and a candidate beam identifier The BFR procedure is complete upon receiving a PDCCH address with a C-RNTI According to various embodiments of the disclosure, a BFD/BFR operation in a plurality of TRPs will be described by referring to SCell BFD/BFR and SpCell BFD/BFR operations for comparison of operations. Although some of the aforementioned operations may be omitted in the reference for the comparison of operations, without being limited thereto, the aforementioned operations may be applied.

An FR1 band mentioned in the disclosure may mean a band of 410 MHz-7125 MHz at which an NR system operates. As a method of delivering a radio resource by using a directivity beam, an RF2 band may be a band including a band of 24250 MHz-52600 MHz and an extended RF2 band, i.e., 52600 MHz-71000 MHz. However, the disclosure is not limited thereto according to various embodiments of the disclosure.

Figure 5A:
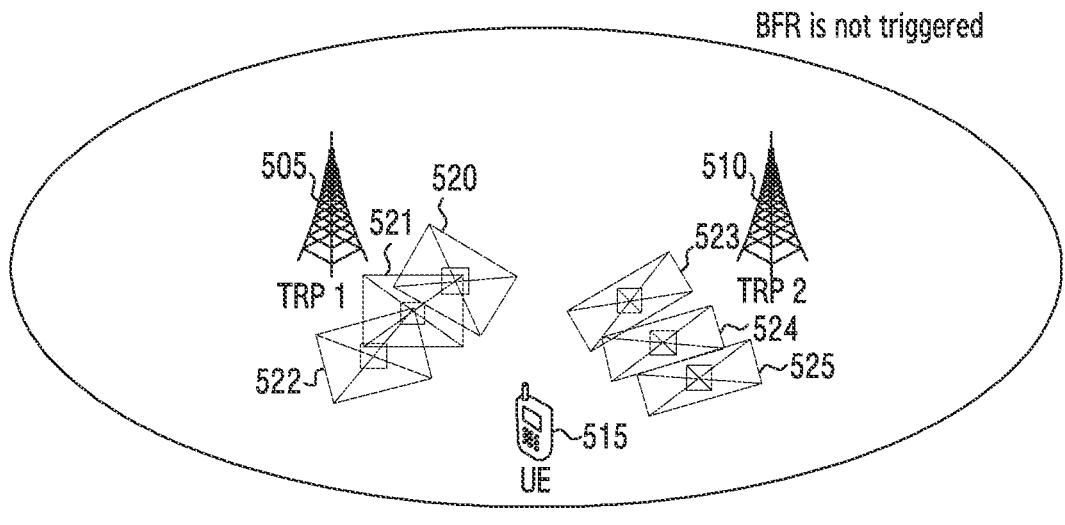
FIGS. 5A and 5B illustrates an example for a cell-based and Tuned Radio Frequency. (TRF)-based beam failure detection/recovery procedure in a wireless communication system according to an embodiment of the disclosure.
Figure 5B:
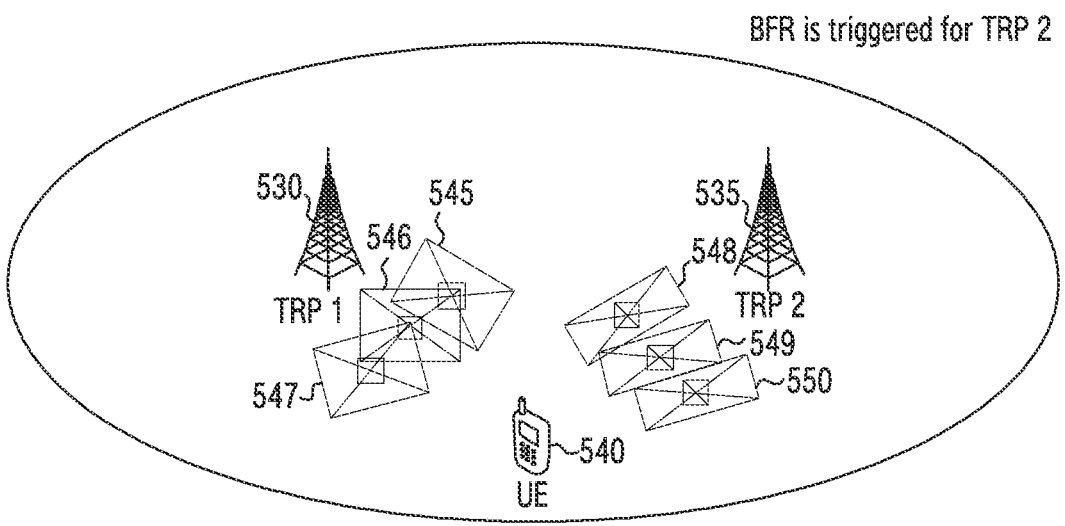

FIGS. 5A and 5B illustrate examples for a cell-based and TRF-based beam failure detection/recovery procedure in a wireless communication system according to an embodiment of the disclosure.

Referring to FIGS. 5A and 5B, the conventional cell-based beam failure detection/recovery scenario (case 1) as depicted in FIG. 5A and the TRP-based beam failure detection/recovery scenario (case 2) as depicted in FIG. 5B will be compared in the description. The two scenarios may be identical in a sense that a plurality of TRPs may be included. However, the two scenarios may not be identical in a sense that the beam failure detection and recovery may be performed on a cell basis in the cell-based beam failure detection/recovery scenario (case 1) and the beam failure detection and recovery may be performed on a TRP basis in the TRP-based beam failure detection/recovery scenario (case 2).

Hereinafter, the cell-based beam failure detection/recovery scenario procedure will be described.

A plurality of TRPs #1 505 and TRPs #2 510 are present in one serving cell, and a UE 515 may perform a plurality of TRP operations according to a BS configuration. The plurality of TRP operations may mean an operation of performing uplink/downlink transmission and reception (e.g., PDCCH/physical downlink shared channel (PDSCH)/PUCCH/physical uplink shared channel (PUSCH) resource transmission and reception) through the plurality of TRPs. The plurality of TRP operations may include a Transmission Configuration Indicator (TCI) state configuration, a TRP-based improvement scheme such as single Downlink Control Information (DCI)-based PDSCH transmission and multi-DCI-based PDSCH transmission through the plurality of TRPs, or the like. According to various embodiments of the disclosure, the cell-based beam failure detection/recovery operation may be configured by applying a beam configuration through the plurality of TRPs, and the UE may perform an operation according to the applied configuration. A list of BFD Resource (RS) may be provided in a serving cell level/unit, and the UE may monitor a beam failure detection resource set configured for the beam failure detection in a serving cell. A candidate beam RS list may be provided together with the configuration, which enables the UE to report an available beam when reporting the BFR. Referring to FIG. 5, the beam failure recovery procedure may not be triggered even if a beam failure occurs in all beams 523, 524, and 525 allocated to, in particular, a specific TRP (herein, the TRP2) 510 among the beam failure detection resources 520, 521, 522, 523, 524, and 525 configured for the UE. As illustrated in FIG. 5A, since one beam 521 is valid among the beams 520, 521, and 522 belonging to the TRP1 505, a valid beam may be present in terms of a serving cell. Therefore, a service may be available through a valid beam without having to trigger the beam failure procedure.

According to an embodiment, the cell-level beam failure detection and recovery (case 1) is possible in the existing system. Upon detecting the beam failure in each of beams belonging to a specific TRP in the TRP-level beam failure detection and recovery (case 2), this may be reported to a BS in the TRP level.

The plurality of TRPs #1 530 and TRPs #2 535 are present in one serving cell, and the UE 540 may perform a plurality of TRP operations according to a BS configuration. Referring to FIG. 5B, although a scenario in which a plurality of TRPs are present in one serving cell is illustrated, the disclosure is not limited thereto, and thus each TRP may belong to a different cell. For example, the disclosure may also apply to a case where the TRP1 belongs to a serving cell 1 and the TRP2 belongs to a serving cell 2. Unlike in the beam failure detection and recovery scenario in a serving cell level/unit (case 1), the beam failure detection and recovery scenario in the TRP level/unit (case 2) may be configured by distinguishing beam failure detection resources to be monitored through respective TRPs and a candidate beam RS list, as described below.

(1) TRP1 dedicated BFD RS resource list, candidate beam resource list (2) TRP2 dedicated BFD RS resource list, candidate beam resource list The UE 540 may independently monitor BFD resources configured for each TRP, and when all BFD RS resource of a specific TRP fail, may trigger BFR in a TRP level. Referring to FIG. 5B, among BFD resources 545, 546, 547, 548, 549, and 550 configured for the UE, when a beam failure occurs in all beams 548, 549, and 550 allocated, in particular, to a specific TRP (TRP2) 535, a TRP-based BFR procedure may be triggered. Since one beam 546 is valid among the beams 545, 546, and 547 belonging to the TRP1 530, a valid beam exists in the TRP1. Therefore, a beam failure procedure is not triggered, and a service may be available through the valid beam. On the other hand, for the TRP2, the UE may report to the BS that all beams belonging to the TRP have failed. When a valid candidate beam RS is present, the UE may transmit it by including a valid candidate beam RS. Through the aforementioned procedure, the BS may allow the UE 540 to improve efficiency of a transmission/reception operation through a beam in the TRP level.

Figure 6:
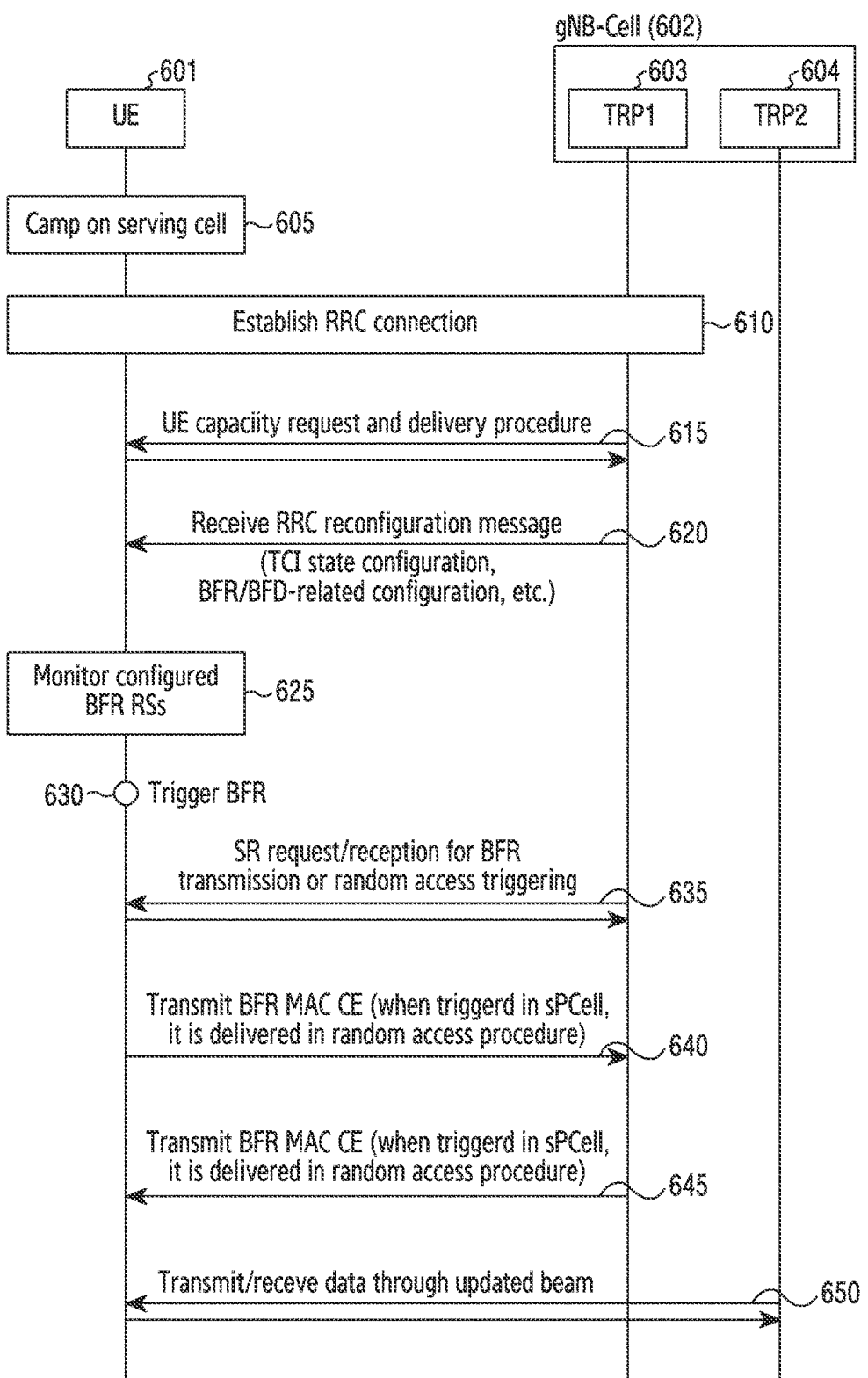
FIG. 6 illustrates a flow of a cell-based beam failure detection and recovery procedure to which a plurality of TRPs are applied in a wireless communication system according to an embodiment of the disclosure.

FIG. 6 illustrates a flow of a cell-based beam failure detection and recovery procedure to which a plurality of TRPs are applied in a wireless communication system according to an embodiment of the disclosure.

Referring to FIG. 6, a flow of a procedure of a cell-based beam failure detection/recovery scenario which is the scenario (case 1) described above with reference to FIG. 5A will be described in detail.

Referring to operation 605, a UE 601 in an idle mode (RRC_IDLE) may search for a suitable cell and camp on a gNB 602. The UE 601 may perform an access to the gNB-Primary Cell (PCell) 602 for reasons such as generation of data to be transmitted (see operation 610). The gNB 602 may be constructed of a plurality of TRPs 603 and 604. The idle mode may be a state in which the UE is not connected to a network for power saving or the like of the UE and thus is not able to transmit data. For data transmission, the UE and the gNB may need to transition to a connected mode (RRC_CONNECTED). The camp-on may mean that the UE is receiving a paging message to determine whether data is transmitted through downlink while the UE resides in a cell.

Referring to operation 610, when the UE succeeds in a procedure of accessing the gNB 602, the UE may change a state to the connected mode (RRC_CONNECTED). The UE in the connected mode may perform data transmission and reception with respect to the gNB.

Referring to operation 615, in the RRC_CONNECTED state, the gNB and the UE may perform a procedure of obtaining a UE capability). According to an embodiment, the gNB may transmit a UE capability enquiry message to the UE. The gNB may request for the UE capability by filtering UE capabilities required in the gNB. The UE may transmit to the gNB a UE capability information message including a UE capability supported by the UE within a request range.

Referring to operation 620, the gNB may transmit to the UE an RRC reconfiguration message including configuration information of the gNB. The RRC message transmitted by the gNB may include configurations (at least one of RadioLinkMonitoringConfig, beamFailureRecoverySCell-Config, and beamFailureRecoveryConfig) for a cell-based BFD/BFR operation. The gNB may transmit a configuration for a measurement resource, a TCI state configuration, or the like to the UE by associating with configurations for the BFD/BFR operation.

Referring to operation 625, the UE may apply a list of BFD RS configuration in a serving cell level/unit, included in the RRC message received from the gNB. The UE may monitor BFD RSs configured for BFD in a serving cell, based on the list of BFD RS configuration.

Referring to operation 630, when all BFD RSs subjected to monitoring are determined as a beam failure (for example, when the BFD RS indicates a beam failure exceeding beamFailureInstanceMaxCount while beamFailureDetectionTimer is running), the UE may trigger Beam Failure Recovery (BFR).

Referring to operation 635, when an uplink resource for transferring an SCell BFR MAC CE is insufficient, the UE may transmit a Scheduling Request (SR) to the gNB. The UE may receive from the gNB a UL grant generated based on the transmitted SR. Referring to operation 635, if SCell BFR is not triggered but sPCell (PCell or PSCell) BFR is triggered, a random access procedure may be triggered. According to an embodiment of the disclosure, the operation 635 may be skipped in the presence of the uplink resource used by the UE to transmit the SCell BER MAC CE, but the disclosure is not limited thereto.

Referring to operation 640, the UE may generate a BFR MAC CE including information on the triggered BFR. The UE may transmit the generated BFR MAC CE to the gNB. When the sPCell (PCell or PSCell) BFR is triggered, the UE may transmit the BFR MAC CE included in msgA (for example, in case of 2 step RACH) or msg3 (for example, in case of 4 step RACH).

Referring to operation 645, the gNB may reconfigure a beam suitable for the UE, based on information on the BFR MAC CE received from the UE. The operation 645 may be performed through a process of changing a TCI state configuration using the RRC message or changing a downlink TCI state using the MAC CE.

Referring to operation 650, the UE may perform data transmission and reception with respect to the gNB, based on a beam recovered through the reconfiguration.

Figure 7:
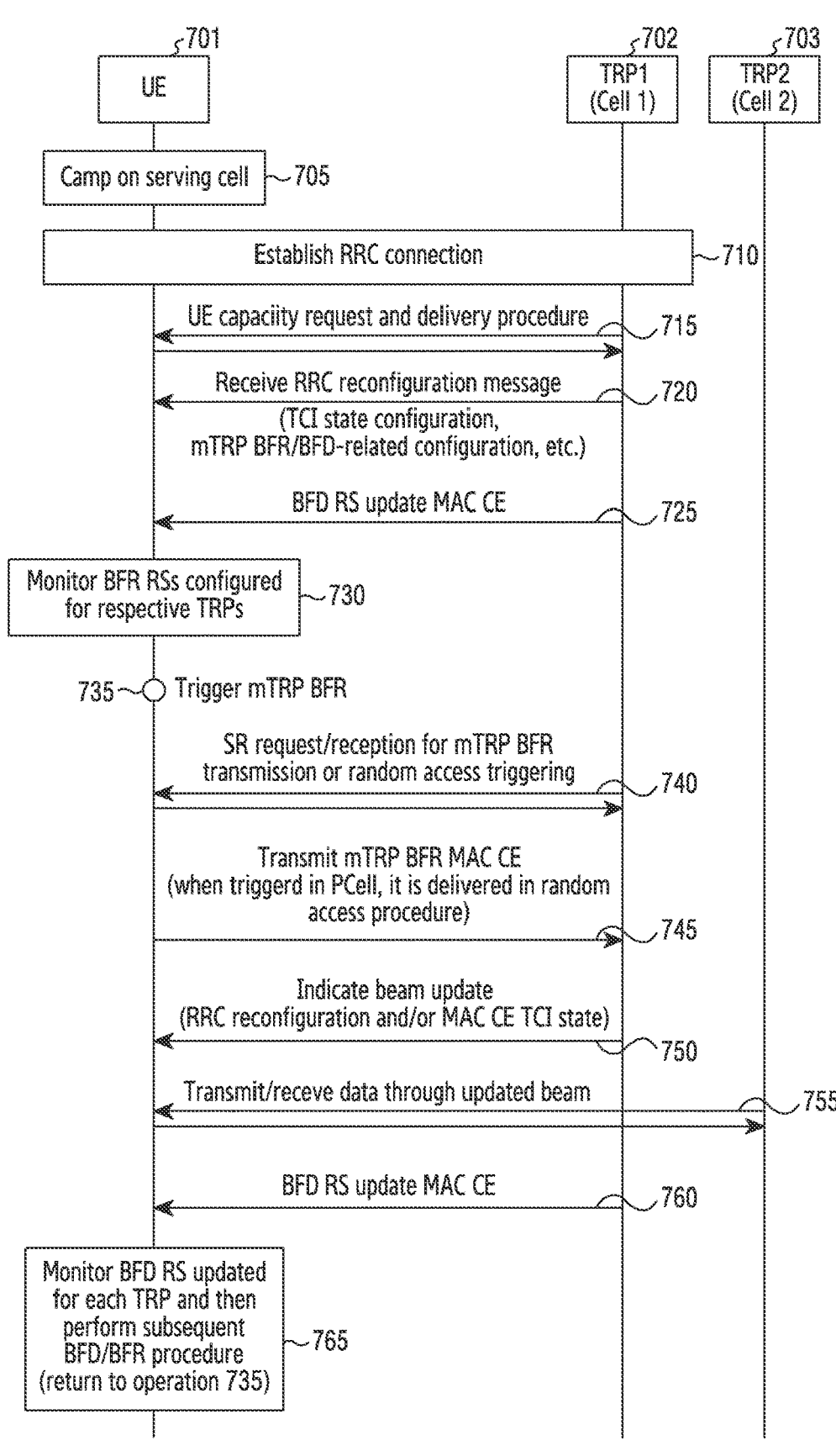
FIG. 7 illustrates a flow of a TRP-based beam failure detection and recovery procedure to which a plurality of TRPs are applied in a wireless communication system according to an embodiment of the disclosure.

FIG. 7 illustrates a flow of a TRP-based beam failure detection and recovery procedure to which a plurality of TRPs are applied in a wireless communication system according to an embodiment of the disclosure.

Referring to FIG. 7, a flow of a procedure of a TRP-based beam failure detection/recovery scenario which is the scenario (case 2) described above with reference to FIG. 5B will be described in detail.

Referring to operation 705, a UE 701 in an idle mode (RRC_IDLE) may search for a suitable cell and camp on a gNB 702. The UE 701 may perform an access to the gNB-PCell 702 for reasons such as generation of data to be transmitted (see operation 710). The gNB 702 may be constructed of a plurality of TRPs. According to various embodiments of the disclosure, serving cells may be constructed of respective TRPs (Cell 1—TRP1 702, Cell 2—TRP2 703), or an inter-cell multiple TRP operation may be performed. The idle mode may be a state in which the UE is not connected to a network for power saving or the like of the UE and thus is not able to transmit data. For data transmission, the UE and the gNB may need to transition to a connected mode (RRC_CONNECTED). The camp-on may mean that the UE is receiving a paging message to determine whether data is transmitted through downlink while the UE resides in a cell.

Referring to operation 710, when the UE succeeds in a procedure of accessing the gNB 702, the UE may change a state to the connected mode (RRC_CONNECTED). The UE in the connected mode may perform data transmission and reception with respect to the BS.

Referring to operation 715, in the RRC_CONNECTED state, the gNB and the UE may perform a procedure of obtaining a UE capability. According to an embodiment, the gNB may transmit a UE capability enquiry message to the UE. The gNB may request for the UE capability by filtering UE capabilities required in the gNB. The UE may transmit to the gNB a UE capability information message including a UE capability supported by the UE within a request range.

Referring to operation 720, the gNB may transmit to the UE an RRC reconfiguration message including configuration information of the gNB. The RRC message transmitted by the gNB may include configurations (at least one of RadioLinkMonitoringConfig, beamFailureRecoverySCell-Config, and beamFailureRecoveryConfig) for a cell-based BFD/BFR operation. The gNB may transmit a configuration for a measurement resource, a TCI state configuration, or the like to the UE by associating with configurations for the BFD/BFR operation. The operation 720 corresponds to the operation 620 of FIG. 6 and differs in that the BFD/BFR is managed for each of a plurality of TRPs. Therefore, RadioLinkMonitoringConfig or beamFailureRecoverySCellConfig for the plurality of TRPs (e.g., TRP1, TRP2) may be configured in the following example.

1. Configure independent BFR RS sets for two TRPs:
(BFD RS set for TRP1, BFD RS set for TRP2; failureDetectionSet1, failureDetectionSet2 in RadioLinkMonitoringConfig)
A BFD RS configuration which is configured in practice in RadioLinkMonitoringRS-r17 may conform to the existing configuration structure. According to various embodiments of the disclosure, there may be various configuration methods associated with a MAC CE configuration.

If a BFD RS set is configured for two TRPs, the existing cell-based BFD RS configuration may not be provided (The following configuration in abstract syntax notation one (ANS.1) may be changed to a conditional condition and may be added. Alternatively, a description related thereto may be added to a field description).

TABLE 1

```
RadioLinkMonitoringConfig ::=    SEQUENCE {
    failureDetectionResourcesToAddModList                                SEQUENCE
(SIZE(1..maxNrofFailureDetectionResources)) OF RadioLinkMonitoringRS
                                                OPTIONAL, -- Need N
    failureDetectionResourcesToReleaseList                               SEQUENCE
(SIZE(1..maxNrofFailureDetectionResources)) OF RadioLinkMonitoringRS-Id
                                                OPTIONAL, -- Need N
    beam FailureInstanceMaxCount       ENUMERATED {n1, n2, n3, n4, n5, n6, n8, n10}
OPTIONAL, -- Need R
    beamFailureDetectionTimer    ENUMERATED {pbfd1, pbfd2, pbfd3, pbfd4, pbfd5, pbfd6,
pbfd8, pbfd10} OPTIONAL, -- Need R
    ... ,
    [[
      failureDetectionSet1-r17    BeamFailureDetectionSet-r17    OPTIONAL, --
Need R failureDetectionSet2-r17    BeamFailureDetectionSet-r17    OPTIONAL
-- Need R
    ]]
}
BeamFailureDetectionSet-r17 ::=    SEQUENCE {
    BFDRSSetId-r17    INTEGER {1..2}                    OPTIONAL, -- Need R
    bfdResourcesToAddModList-r17 SEQUENCE (SIZE(1..maxNrofBFDResourcePerSet-r17)) OF
RadioLinkMonitoringRS-r17                    OPTIONAL, -- Need N
    bfdResourcesToReleaseList-r17 SEQUENCE (SIZE(1..maxNrofBFDResourcesPerSet-r17)) OF
RadioLinkMonitoringRS-Id-r17                    OPTIONAL, -- Need N
    beamFailureInstanceMaxCount-r17    ENUMERATED {n1, n2, n3, n4, n5, n6, n8, n10}
OPTIONAL, -- Need R
    beamFailureDetectionTimer-r17    ENUMERATED {pbfd1, pbfd2, pbfd3, pbfd4, pbfd5, pbfd6,
pbfd8, pbfd10} OPTIONAL -- Need R
    ...
}
```

2. Candidate beam RS list information for each of two TRPs
(BeamFailureRecoveryServingCellConfig (candidate-BeamRSList, candidateBeamRSList2)) including
In case of a beam in which a candidate beam for the TRP2 is configured as an inter-cell, an indication indicating this may be added (additionalPCI).

TABLE 2

```
BeamFailureRecoveryServingCellConfig-r17 ::= SEQUENCE {
    rsrp-ThresholdBFR-r17         RSRP-Range              OPTIONAL, -- Need M
    candidateBeamRSList-r17           SEQUENCE (SIZE(1..maxNrofCandidateBeams-r17)) OF
CandidateBeamRS-r16    OPTIONAL, -- Need M
        candidateBeamRSList2-r17       SEQUENCE (SIZE(1..maxNrofCandidateBeams-r17)) OF
CandidateBeamRS-r16    OPTIONAL, -- Need M
        additionalPCI-r17             AdditionalPCIIndex-r17
        OPTIONAL, -- Need M
    ...
}
```

3. PUCCH-scheduling request associated with configured BFD RS sets for each TRP

Association information for a Scheduling Request (SR) may be additionally transferred. When BFD occurs in a BFD RS for each TRP, the association information may mean a configuration related to a resource used by a UE to request a BS to provide the SR, and may be associated with each SR ID(schedulingRequestID-BFR, schedulingRequestID-BFR2).

According to an embodiment of the disclosure, upon receiving the configuration MAC CE, the gNB may identify that the BFR MAC CE for the TRP reported by the UE is transmitted for BFD RSs to which an updated indicated by the gNB is applied. When the gNB has failed to receive the confirmation MAC CE, if the BFR MAC CE for the TRP is transmitted from the UE, the gNB may identify that information on the BFR MAC CE for the TRP is a report associated with a BFD RS used before applying the BFD RS

TABLE 3

```
MAC-CellGroupConfig ::=         SEQUENCE {
   drx-Config                   SetupRelease { DRX-Config }      OPTIONAL, -- Need M
   schedulingRequestConfig          SchedulingRequestConfig          OPTIONAL, -- Need M
   bsr-Config                   BSR-Config            OPTIONAL, -- Need M
   tag-Config                   TAG-Config            OPTIONAL, -- Need M
   phr-Config                   SetupRelease { PHR-Config }     OPTIONAL, -- Need M
   skipUplinkTxDynamic          BOOLEAN,
   ...,
   [[
   csi-Mask                     BOOLEAN               OPTIONAL, -- Need M
   dataInactivityTimer          SetupRelease { DataInactivityTimer }    OPTIONAL -- Cond
MCG-Only
   ]],
   [[
   usePreBSR-r16                ENUMERATED {true}     OPTIONAL, -- Need R
   schedulingRequestID-LBT-SCell-r16    SchedulingRequestId     OPTIONAL, -- Need
R
   lch-BasedPrioritization-r16      ENUMERATED {enabled}    OPTIONAL, -- Need
R
   schedulingRequestID-BFR-SCell-r16    SchedulingRequestId     OPTIONAL, -- Need
R
   drx-ConfigSecondaryGroup-r16    SetupRelease { DRX-ConfigSecondaryGroup } OPTIONAL
-- Need M
   ]],
   [[
   enhancedSkipUplinkTxDynamic-r16        ENUMERATED {true}       OPTIONAL, --
Need R
   enhancedSkipUplinkTxConfigured-r16     ENUMERATED {true}       OPTIONAL --
Need R
   ]],
   [[
   schedulingRequestID-BFR-r17    SchedulingRequestId-r17          OPTIONAL, --
Need R
   schedulingRequestID-BFR2-r17    SchedulingRequestId-r17          OPTIONAL --
Need R
   ]]
}
```

Referring to operation 725, the gNB may transmit a BFD RS update MAC CE to the UE. The BFD RS update transmitted by the gNB may be used to indicate update information for a configuration of a resource list for beam failure detection in a TRP level/unit (a list of BFD RS for TRP1 and TRP2), configured through RRC. According to an embodiment of the disclosure, MAC CE transmission of the operation 725 may be skipped, and in this case, the UE may maintain the BFD RS configuration configured through RRC. Referring to operation 725, when the UE receives the MAC CE, the UE may initialize a BFR-related parameter thereof, i.e., BFI_COUNTER, to 0, and may cancel BFR for an ongoing BFD RS set. Since a BFD RS applied to measure BFD for the TRP has been updated, the UE may initialize a BFR procedure for the ongoing BFD RS before MAC CE reception. According to an embodiment of the disclosure, although not shown in FIG. 7, the UE may receive a BFD RS update MAC CE, and may perform signaling for necessity of explicit MAC layer ACK. For example, as a response message for the BFD RS update MAC CE, a confirmation MAC CE operation may be newly introduced. The UE may report to the gNB whether the BFD RS update MAC CE is received through the configuration MAC CE.

update MAC CE. According to an embodiment, when the confirmation MAC CE operation is not introduced, the gNB may assume that the BFD RS update MAC CE for the TRP has been transmitted to the UE (e.g., an HARQ operation at a PHY layer below a MAC layer may be used to confirm the transfer of the MAC CE). The gNB may identify a BFR MAC for the TRP received from the UE thereafter according to a result of applying the update. Upon receiving the BFD RS update MAC CE, the UE may apply a Transmission Block (TB) including the MAC CE after an "X" slot from a reception slot. Herein, the "X" slot may be a value defined in a standard, or may be a value given by an RRC configuration or the like. According to various embodiments of the disclosure, the aforementioned value may be given in a symbol or a specific time unit (e.g., ms) in addition to a slot.

Referring to operation 730, the UE may apply a configuration of a resource list for beam failure detection in a TRP level/unit (a list of BFD RS for TRP1 and TRP2), received through an RRC message or an MAC CE. The UE may monitor beam failure detection resources configured for beam failure detection at a specific TRP, for respective TRPs.

Referring to operation 735, when all BFD RSs monitored for respective TRPs are determined as a beam failure (for example, when the BFD RS indicates a beam failure exceeding beamFailureInstanceMaxCount while beamFailureDetectionTimer is running), the UE may trigger Beam Failure Recovery (BFR) for the TRP.

Referring to operation 740, when an uplink resource for transferring a BFR MAC CE for each TRP is insufficient, the UE may transmit a Scheduling Request (SR) to the gNB. The UE may receive a UL grant generated based on the transmitted SR. Referring to operation 740, if SCell BFR is not triggered but sPCell (PCell or PSCell) BFR is triggered, a random access procedure may be triggered. According to an embodiment of the disclosure, the operation 740 may be skipped in the presence of the uplink resource used by the UE to transmit the BER MAC CE for each TRP, but the disclosure is not limited thereto.

Referring to operation 745, the UE may generate a BFR MAC CE (e.g., mTRP BFR MAC CE) including information on BFR of the triggered TRP. The UE may transmit the generated BFR MAC CE to the gNB. When the sPCell (PCell or PSCell) BFR is triggered, the UE may transmit the mTRP BFR MAC CE included in msgA (for example, in case of 2 step RACH) or msg3 (for example, in case of 4 step RACH).

Referring to operation 750, the gNB may reconfigure a beam suitable for the UE, based on information on the BFR MAC CE received from the UE. The operation 750 may be performed through a process of changing a TCI state configuration using the RRC message or changing a downlink TCI state using the MAC CE.

Referring to operation 755, the UE may perform data transmission and reception with respect to the gNB, based on a beam recovered through the reconfiguration.

Referring to operation 760, since a BFD RS configuration to be measured by the UE for each TRP may vary depending on a changed beam configuration, the gNB may transmit a MAC CE for updating a BFD RS to the UE. Referring to operation 760, if the UE receives the MAC CE, the UE may initialize a BFR-related parameter thereof, i.e., BFI_COUNTER, to 0. The UE may cancel BFR for an ongoing BFD RS set. According to an embodiment, the operation in which the UE initializes the BFI_COUNTER to 0 and cancels the BFR for the ongoing BFD RS set may be applied in the operation 750 in which a beam change is received from the gNB. Since a BFD RS applied to measure BFD for the TRP has been updated, the UE may initialize a BFR procedure for the ongoing BFD RS before MAC CE reception. According to an embodiment of the disclosure, although not shown in FIG. 7, the UE may receive a BFD RS update MAC CE, and may perform signaling for necessity of explicit MAC layer ACK. For example, as a response message for the BFD RS update MAC CE, a confirmation MAC CE operation may be newly introduced. The UE may report to the gNB whether the BFD RS update MAC CE is received through the configuration MAC CE. Upon receiving the configuration MAC CE, the gNB may identify that the BFR MAC CE for the TRP reported by the UE is transmitted for BFD RSs to which an updated indicated by the gNB is applied. When the gNB has failed to receive the confirmation MAC CE, if the BFR MAC CE for the TRP is transmitted from the UE, the gNB may identify that information on the BFR MAC CE for the TRP is a report associated with a BFD RS used before applying the BFD RS update MAC CE. According to an embodiment, when the confirmation MAC CE operation is not introduced, the gNB may assume that the BFD RS update MAC CE for the TRP has been transmitted to the UE (e.g., an HARQ operation at a PHY layer below a MAC layer may be used to confirm the transfer of the MAC CE). The gNB may identify a BFR MAC for the TRP received from the UE thereafter according to a result of applying the update. Upon receiving the BFD RS update MAC CE, the UE may apply a Transmission Block (TB) including the MAC CE after an "X" slot from a reception slot. Herein, the "X" slot may be a value defined in a standard, or may be a value given by an RRC configuration or the like. According to various embodiments of the disclosure, the aforementioned value may be given in a symbol or a specific time unit (e.g., ms) in addition to a slot. The aforementioned beam update indication MAC CE and BFD RS update MAC CE may be transferred by being included in one MAC PDU through implementations of the gNB.

Referring to operation 765, the UE may monitor the updated BFD RS for each TRP. The UE may perform the BFD/BFR procedure. According to an embodiment, returning to the operation 735, subsequent operations may be performed.

According to various embodiments of the disclosure, a BFD RS configuration may be provided for each TRP, and the BFD RS configuration may be dynamically updated depending on a change of a beam (TCI state). According to an embodiment, the UE may dynamically update a BFD RS to be measured for BFD for each TRP through a MAC CE. When the BFD RS is configured through only an RRC configuration, an operation in which the gNB updates a reception beam and a transmission beam (e.g., TCI state, spatial relation for UL resource or SRS resource) according to a beam state of the UE may be performed in a MAC CE or DCI level. When a beam configuration changes through the MAC CE or the DCI, an accurate operation may not be performed if the BFD RS update is not provided through additional RRC configuration reception. According to various embodiments of the disclosure, when the beam configuration changes through the MAC CE and the DCI, the MAC CE for the BFD RS update is provided together, thereby accurately performing a BFD operation for each TRP. In the following embodiments, a configuration of the MAC CE for the BFD RS update will be described in detail.

Figure 8:
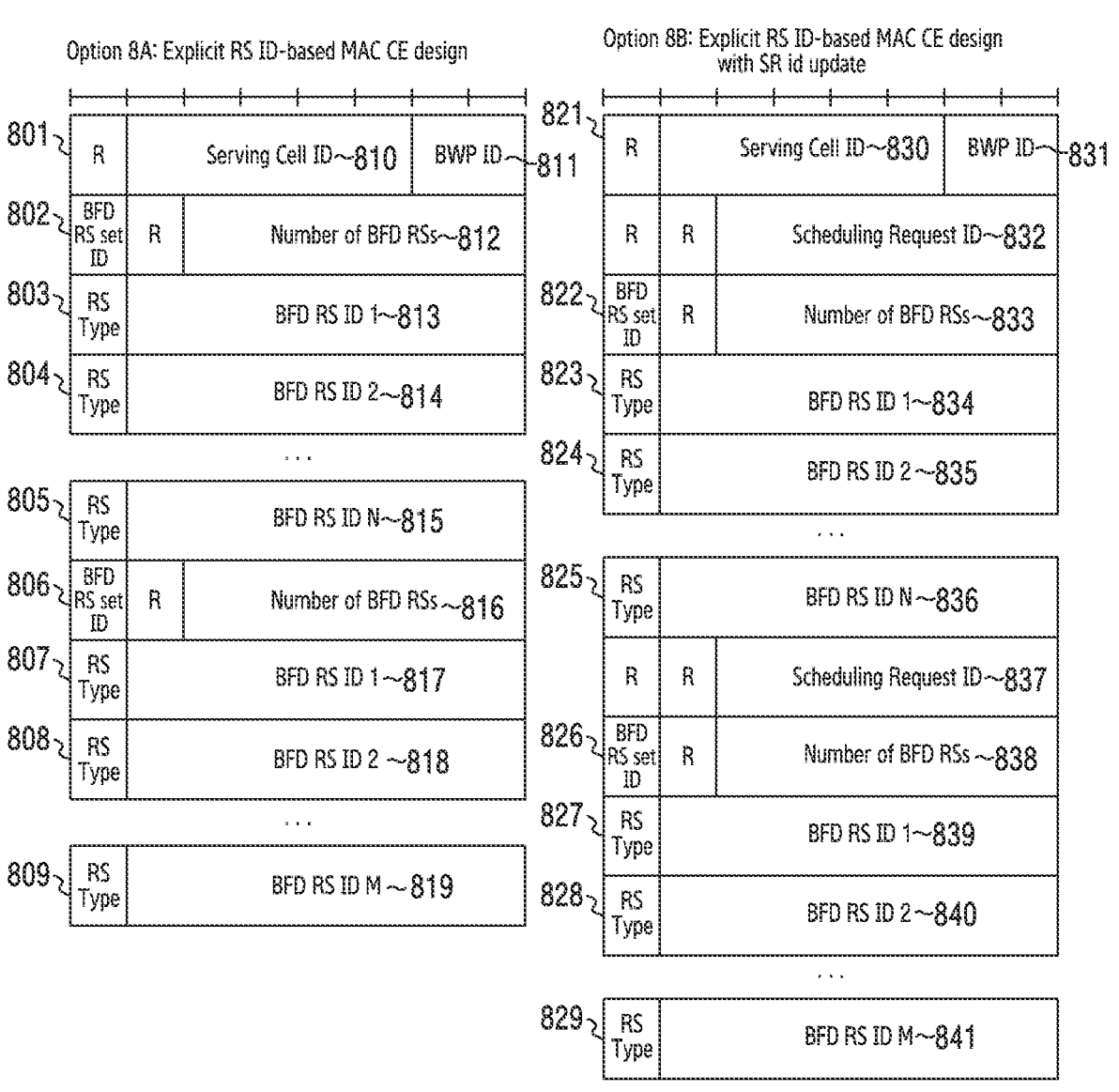
FIG. 8 illustrates an example of a Medium Access Control (MAC) Control Element (CE) structure for updating a Beam Failure Detection Resource (BFD RS) for each TRP in a wireless communication system according to an embodiment of the disclosure.

FIG. 8 illustrates an example of a MAC CE structure for updating a BFD RS for each TRP in a wireless communication system according to an embodiment of the disclosure.

Specifically, FIG. 8 illustrates a method of explicitly indicating a type of the BFD RS to be measured by a UE and an actual resource.

Referring to FIG. 8, a Synchronization Signal Block (SSB) resource identifier or CSI-RS resource identifier including specific resource information for BFD RSs to be updated by the UE may be provided in the MAC CE for updating the BFD RS for each TRP. Since the SSB resource identifier or the CSI-RS resource identifier are provided, the UE may perform the BFD RS update by using information in the MAC CE for updating the BFD RS for each TRP.

The following structure may be applied to an RRC configuration as described above.

1. Additional BFD RS sets (failureDetectionSet1, failureDetectionSet2) for a TRP1 and a TRP2 may be configured in RadioLinkMonitoringConfig IE.

2. BFD RS set configuration (BeamFailureDetectionSet IE) may include BFD RS resources to be measured by the UE (for example, one or a plurality of resources are configurable, and the configurable resource is a BFD RS resource measured by the UE before receiving a BFD RS update MAC CE), a maximum beam failure count for BFR triggering, a beam failure measurement timer configuration, or the like.

3. A BFD RS resource configured in practice may be a resource indicated by an SSB index or a CSI-RS index.

Number of BFD RSs (812, 816): Indicator indicating the number of BFD RSs indicated per BFD RS set. Accord-

TABLE 4

```
RadioLinkMonitoringConfig ::=    SEQUENCE {
    failureDetectionResourcesToAddModList                                          SEQUENCE
(SIZE(1..maxNrofFailureDetectionResources)) OF RadioLinkMonitoringRS
                                             OPTIONAL, -- Need N
    failureDetectionResourcesToReleaseList                                         SEQUENCE
(SIZE(1..maxNrofFailureDetectionResources)) OF RadioLinkMonitoringRS-Id
                                             OPTIONAL, -- Need N
    beamFailureInstanceMaxCount       ENUMERATED {n1, n2, n3, n4, n5, n6, n8, n10}
OPTIONAL, -- Need R
    beamFailureDetectionTimer     ENUMERATED {pbfd1, pbfd2, pbfd3, pbfd4, pbfd5, pbfd6,
pbfd8, pbfd10} OPTIONAL, -- Need R
    ... ,
    [[
        failureDetectionSet2-r17    BeamFailureDetectionSet-r17    OPTIONAL, --
Need R failureDetectionSet2-r17    BeamFailureDetectionSet-r17    OPTIONAL
-- Need R
    ]]
}
BeamFailureDetectionSet-r17 :=    SEQUENCE {
    BFDRSSetId-r17    INTEGER {1..2}                    OPTIONAL, -- Need R
    bfdResourcesToAddModList-r17 SEQUENCE (SIZE(1..maxNrofBFDResourcePerSet-r17)) OF
RadioLinkMonitoringRS-r17                     OPTIONAL, -- Need N
    bfdResourcesToReleaseList-r17 SEQUENCE (SIZE(1..maxNrofBFDResourcesPerSet-r17)) OF
RadioLinkMonitoringRS-Id-r17                     OPTIONAL, -- Need N
    beamFailureInstanceMaxCount-r17    ENUMERATED {n1, n2, n3, n4, n5, n6, n8, n10}
OPTIONAL, -- Need R
    beamFailureDetectionTimer-r17       ENUMERATED {pbfd1, pbfd2, pbfd3, pbfd4, pbfd5, pbfd6,
pbfd8, pbfd10} OPTIONAL -- Need R
    ...
}
RadioLinkMonitoringRS-r17 ::=    SEQUENCE {
    radioLinkMonitoringRS-Id    RadioLinkMonitoringRS-Id,
    purpose        ENUMERATED {beamFailure, rlf, both},
    detectionResource    CHOICE {
        ssb-Index        SSB-Index,
        csi-RS-Index        NZP-CSI-RS-ResourceId
    },
    ...
}
```

In addition to the aforementioned RRC configuration, a UE may receive a BFD RS update MAC CE for each TRP from a BS since the BFD RS update depending on a dynamic beam change is necessary. Referring to FIG. 8, the following structure may be possible. Hereinafter, a method is described distinctively according to whether changing of a PUCCH-SR configuration associated with a BFD RS set is also dynamically performed together in the BFD RS update MAC CE.

Option (8A): Indicate BFD RS Resource to be Updated Explicitly in MAC CE

Reserved bits (801): Although a plurality of reserved bits are omitted in the illustration, the disclosure is not limited thereto.

Serving cell ID (5 bits) (810): Serving cell identifier to which information indicated in MAC CE is applied.

BWP ID (2 bits) (811): Bandwidth Part (BWP) identifier to which information indicated in MAC CE is applied.

BFD RS set ID (1 bit) (802, 806): BFD RS set identifier to which BFD RSs to be updated are applied (for example, a BFD RS set 1 is a BFD RS set for a TRP1, and a BFD RS set 2 is a BFD RS set for a TRP2). According to various embodiments of the disclosure, if two configurations are always present in the BFD RS sets included in the MAC CE, a BFD RS set ID field may be omitted. In this case, however, it may be signaled to BFD RS sets for the TRP1 and the TRP2, in that order.

ing to various embodiments of the disclosure, when only two BFD RSs are indicated in one BFD RS set, only 1 bit may be used for the indication. When only 64 BFD RSs are indicated in one BFD RS set, a length of 6 bits may be required. According to a count indicated in the Number of BFD RSs field, the number of octets in which a subsequent BFD RS resource identifier is included may be indicated together.

RS type (1 bit) (803, 804, 805, 807, 808, 809): Indicator identifying whether BFD RS ID is SSB or CSI RS. When an RS type field is indicated as 0, a subsequent BFD RS ID may be represented as a 6 bit-length SSB identifier. When the RS type field is indicated as 1, the subsequent BFD RS ID may be represented as a 7 bit (or 8 bit)-length CSI RS identifier.

BFD RS ID (813, 814, 815, 817, 818, 819): As a BFD RS resource for each BFD RS set to be updated in practice, it may indicate an SSB identifier or a CSI-RS identifier. A real resource type may be determined according to a value indicated in the RS type field. A real bit length may be determined according to a length of an SSB resource and CSI RS resource. According to an embodiment, when the SSB identifier has a maximum length of 64 and the CSI-RS has a maximum length of 256, the BFD RS ID field may have a length of 8 bits. When 0 is indicated in the RS type field, MSB 2 bits may be ignored, and subsequent bits may be interpreted as an SSB index. When 1 is indicated in the RS type field, the BFD RS ID field may be interpreted as a CSI-RS identifier.

Option (8B): Indicate BFD RS Resource to be Updated Explicitly in MAC CE, and Associated PUCCH-SR Configuration Reserved bits (821): Although a plurality of reserved bits are omitted in the illustration, the disclosure is not limited thereto.

Serving cell ID (5 bits) (830): Serving cell identifier to which information indicated in MAC CE is applied.

BWP ID (2 bits) (831): Bandwidth Part (BWP) identifier to which information indicated in MAC CE is applied.

Scheduling Request ID (832, 837): Scheduling request configuration identifier related to a PUCCH-SR configuration, to be applied when a BFS RS set is updated. A real field size may be determined according to a maximum length to which the scheduling request configuration is applied.

BFD RS set ID (1 bit) (822, 826): BFD RS set identifier to which BFD RSs to be updated are applied (for example, a BFD RS set 1 is a BFD RS set for a TRP 1, and a BFD RS set 2 is a BFD RS set for a TRP2). According to various embodiments of the disclosure, if two configurations are always present in the BFD RS sets included in the MAC CE, a BFD RS set ID field may be omitted. In this case, however, it may be signaled to BFD RS sets for the TRP1 and the TRP2, in that order.

Number of BFD RSs (833, 838): Indicator indicating the number of BFD RSs indicated per BFD RS set. According to various embodiments of the disclosure, when only two BFD RSs are indicated in one BFD RS set, only 1 bit may be used for the indication. When only 64 BFD RSs are indicated in one BFD RS set, a length of 6 bits may be required. According to a count indicated in the Number of BFD RSs field, the number of octets in which a subsequent BFD RS resource identifier is included may be indicated together.

RS type (1 bit) (823, 824, 825, 827, 828, 829): Indicator identifying whether BFD RS ID is SSB or CSI RS. When an RS type field is indicated as 0, a subsequent BFD RS ID may be represented as a 6 bit-length SSB identifier. When the RS type field is indicated as 1, the subsequent BFD RS ID may be represented as a 7 bit (or 8 bit)-length CSI RS identifier.

BFD RS ID (834, 835, 836, 839, 840, 841): As a BFD RS resource for each BFD RS set to be updated in practice, it may indicate an SSB identifier or a CSI-RS identifier. A real resource type may be determined according to a value indicated in the RS type field. A real bit length may be determined according to a length of an SSB resource and CSI RS resource. According to an embodiment, when the SSB identifier has a maximum length of 64 and the CSI-RS has a maximum length of 256, the BFD RS ID field may have a length of 8 bits. When 0 is indicated in the RS type field, MSB 2 bits may be ignored, and subsequent bits may be interpreted as an SSB index. When 1 is indicated in the RS type field, the BFD RS ID field may be interpreted as a CSI-RS identifier.

Referring to FIG. 8, a BFD RS update MAC CE may have a new Logical Channel Identifier (LCID) or extended Logical Channel Identifier (eLCID). The BFD RS update MAC CE may be distinguished through the LCID or eLCID determined in a MAC PDU sub-header. The BFD RS update MAC CE may include one or two BFD RS sets. A MAC CE may also be applied to a plurality of serving cells, and may have a format in which the aforementioned MAC CE format is extended in units of a serving cell.

Figure 9:
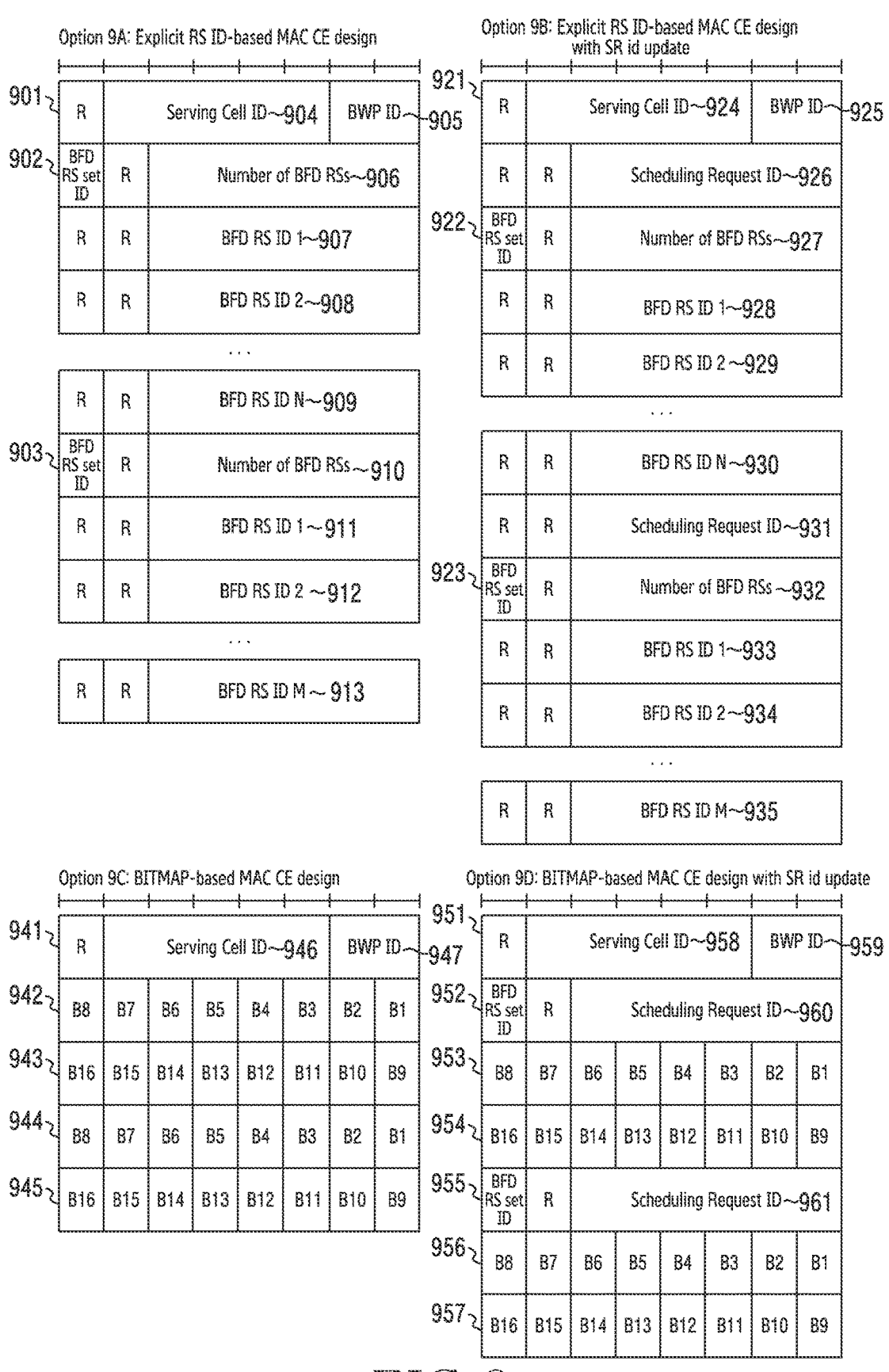
FIG. 9 illustrates another example of a MAC CE structure for updating a BFD RS for each TRP in a wireless communication system according to an embodiment of the disclosure.

FIG. 9 illustrates another example of a MAC CE structure for updating a BFD RS for each TRP in a wireless communication system according to an embodiment of the disclosure.

Specifically, referring to FIG. 9, in the illustrated example, a candidate BFD RS to be measured by a UE may be provided through RRC, and a resource used in practice in a MAC CE is indicated.

Referring to FIG. 9, a plurality of pieces of BFD RS information may be provided in an RRC configuration. Based on candidate BFD RS resources provided through the provided RRC configuration, the MAC CE for updating the BFD RS for each TRP may include an indicator in BFD RSs to be updated by the UE. Specifically, referring to FIG. 9, two methods are illustrated in detail, and are described by being divided into a method of an embodiment 2-1 and a method of an embodiment 2-2.

The following structure may be applied to the RRC configuration in the embodiment 2-1.

1. Additional BFD RS sets (failureDetectionSet1, failureDetectionSet2) for a TRP1 and a TRP2 may be configured in RadioLinkMonitoringConfig IE.

2. BFD RS set configuration (BeamFailureDetectionSet IE) may include BFD RS resources to be measured by the UE, a maximum beam failure count for BFR triggering, a beam failure measurement timer configuration, or the like.

3. BFD RS resource configuration

It may be indicated by including a plurality of candidate BFD RS resources. For example, 8 candidate BFD RSs to be measured as a BFD RS set may be configured (for example, a list and index for configuring a candidate BFD RS identified by radioLinkMonitoringRS-Id or included in a BFD RS set are introduced). Among the candidate BFD RSs, a resource which requires monitoring in practice or which is to be updated may be indicated through the MAC CE.

In this case, there may be a method of allowing a MAC CE to be transferred always after an RRC configuration in order to clearly indicate which resource needs to be measured, after a candidate resource is configured through RRC.

Alternatively, there may be an indicator or rule indicating that a specific resource among candidate BFD RSs configured through RRC may be used through an initial configuration before receiving the MAC CE. For example, a first BFD RS resource may be monitored or a resource identifier requiring initial monitoring in practice may be included in transmission.

The RRC configuration in the embodiment 2-2 differs from the embodiment 2-1 as follows.

4. A plurality of sets for candidate BFD RSs are introduced in a BFD RS set configuration, and a MAC CE indicates a set ID for the BFD RSs to indicate a BFD RS update.

5. For example, 4 candidate set configurations are introduced in a BFD RS set 1 (TRP1), and a plurality of BFD RSs may be included in each of them. Since an identifier for each of candidate sets is indicated in the MAC CE, BFD RSs to be updated by the UE may be indicated.

6. Example in embodiment 2-1

RRC configuration

BFD RS set 1: BFD RS #1, BFD RS #2, BFD RS #3, BFD RS #4

BFD RS set 2: BFD RS #5, BFD RS #6, BFD RS #7, BFD RS #8

MAC CE signaling

BFD RS set 1: BFD RS #2, BFD RS #3

BFD RS set 2: BFD RS #7, BFD RS #8

7. Example in embodiment 2-2

RRC configuration

BFD RS set 1:

a) BFD RS candidate set #1: BFD RS #1, BFD RS #2, BFD RS #3, BFD RS #4 b) BFD RS candidate set #2: BFD RS #5, BFD RS #6, BFD RS #7, BFD RS #8

BFD RS set 2:

a) BFD RS candidate set #3: BFD RS #1, BFD RS #2, BFD RS #7, BFD RS #8 b) BFD RS candidate set #4: BFD RS #2, BFD RS #3, BFD RS #4, BFD RS #5

MAC CE signaling

BFD RS set 1: BFD RS candidate set #2

BFD RS set 2: BFD RS candidate set #3

The MAC CE structure applied to the embodiment 2-1 and the embodiment 2-2 is the same as described below. According to various embodiments of the disclosure, without being limited to the illustration of FIG. 9, the description will focus on a part indicating a difference of each embodiment (e.g., a method of representing a BFD RS ID).

Option (9A): Indicate BFD RS Resource Updated Explicitly in MAC CE

Reserved bits (901): Although a plurality of reserved bits are omitted in the illustration, the disclosure is not limited thereto.

Serving cell ID (5 bits) (904): Serving cell identifier to which information indicated in MAC CE is applied.

BWP ID (2 bits) (905): Bandwidth Part (BWP) identifier to which information indicated in MAC CE is applied.

BFD RS set ID (1 bit) (902, 903): BFD RS set identifier to which BFD RSs to be updated are applied (for example, a BFD RS set 1 is a BFD RS set for a TRP1, and a BFD RS set 2 is a BFD RS set for a TRP2). According to various embodiments of the disclosure, if two configurations are always present in the BFD RS sets included in the MAC CE, a BFD RS set ID field may be omitted. In this case, however, it may be signaled to BFD RS sets for the TRP1 and the TRP2, in that order.

Number of BFD RSs (906, 910): Indicator indicating the number of BFD RSs indicated per BFD RS set. According to various embodiments of the disclosure, when only two BFD RSs are indicated in one BFD RS set, only 1 bit may be used for the indication. When only 64 BFD RSs are indicated in one BFD RS set, a length of 6 bits may be required. According to a count indicated in the Number of BFD RSs field, the number of octets in which a subsequent BFD RS resource identifier is included may be indicated together.

BFD RS ID (907, 908, 909, 911, 912, 913): BFD RS ID indicating a BFD RS resource for each BFD RS set to be updated in practice.

1) In case of embodiment 2-1: BFD RS index (or radioLinkMonitoringRS-Id may be used) allocated to a plurality of BFD RS lists provided for each BFD RS set in RRC configuration. Individual BFD RSs may have an index, and candidate BFD RSs may be indicated in MAC CE.

2) In case of embodiment 2-2: BFD RS index allocated to a plurality of BFD RS set lists provided for each BFD RS set in RRC configuration. It may be identified by an index for a set including a plurality of BFD RSs. When a BFD RS set index is indicated in the MAC CE, an update may be performed by applying all of BFD RSs included in the index.

In this case, only one BFD RS ID (e.g., a candidate BFD RS set ID in practice) may be necessary or activated, or the number of BFD RSs field may be omitted.

Option (9B): Indicate BFD RS Resource to be Updated Explicitly in MAC CE, and Associated PUCCH-SR Configuration Reserved bits (921): Although a plurality of reserved bits are omitted in the illustration, the disclosure is not limited thereto.

Serving cell ID (5 bits) (924): Serving cell identifier to which information indicated in MAC CE is applied.

BWP ID (2 bits) (925): Bandwidth Part (BWP) identifier to which information indicated in MAC CE is applied.

Scheduling Request ID (926, 931): Scheduling request configuration identifier related to a PUCCH-SR configuration, to be applied when a BFS RS set is updated. A real field size may be determined according to a maximum length to which the scheduling request configuration is applied.

BFD RS set ID (1 bit) (922, 923): BFD RS set identifier to which BFD RSs to be updated are applied (for example, a BFD RS set 1 is a BFD RS set for a TRP1, and a BFD RS set 2 is a BFD RS set for a TRP2). According to various embodiments of the disclosure, if two configurations are always present in the BFD RS sets included in the MAC CE, a BFD RS set ID field may be omitted. In this case, however, it may be signaled to BFD RS sets for the TRP1 and the TRP2, in that order.

Number of BFD RSs (927, 932): Indicator indicating the number of BFD RSs indicated per BFD RS set. According to various embodiments of the disclosure, when only two BFD RSs are indicated in one BFD RS set, only 1 bit may be used for the indication. When only 64 BFD RSs are indicated in one BFD RS set, a length of 6 bits may be required. According to a count indicated in the Number of BFD RSs field, the number of octets in which a subsequent BFD RS resource identifier is included may be indicated together.

BFD RS ID (928, 929, 930, 933, 934, 935): BFD RS ID indicating a BFD RS resource for each BFD RS set to be updated in practice.

1) In case of embodiment 2-1: BFD RS index (or radioLinkMonitoringRS-Id may be used) allocated to a plurality of BFD RS lists provided for each BFD RS set in RRC configuration. Individual BFD RSs may have an index, and candidate BFD RSs may be indicated in MAC CE.

2) In case of embodiment 2-2: BFD RS index allocated to a plurality of BFD RS set lists provided for each BFD RS set in RRC configuration. It may be identified by an index for a set including a plurality of BFD RSs. When a BFD RS set index is indicated in the MAC CE, an update may be performed by applying all of BFD RSs included in the index. In this case, only one BFD RS ID (e.g., a candidate BFD RS set ID in practice) may be necessary or activated, or the number of BFD RSs field may be omitted.

In the option 9C and the option 9D, reserved bits are depicted as 941 and 951 respectively, serving cell IDs are depicted as 946 and 958 respectively, and BWP IDs are depicted as 947 and 959 respectively. In option 9D, BFD RS set ID (1 bit) are depicted as 952 and 955. In the option 9C and the option 9D, BFD RS IDs in the option 9A and the option 9B, respectively, are changed in bitmap formats 942, 943, 944, 945, 953, 954, 956, and 957. Although it is illustrated in the option 9C that the BFD RS set ID field is omitted and BFD RSs for the BFD RS set IDs #1 and #2 are listed in the bitmap format, without being limited thereto, it is possible to modify that the BFD RS set ID is indicated by using a specific field. In this case, the BFD RS set ID field may be added by introducing an additional octet, or may be used by changing one B-field. A difference between the option 9C and the option 9D may be whether it is possible to dynamically change/update scheduling request IDs 960 and 961 as described in the aforementioned option 9A and option 9B.

A BFD RS update MAC CE applied to the embodiment 2 may have a new LCID or eLCID. The BFD RS update MAC CE may be distinguished through the LCID or eLCID determined in a MAC PDU sub-header. The BFD RS update MAC CE may include one or two BFD RS sets. A MAC CE may also be applied to a plurality of serving cells, and may have a format in which the aforementioned MAC CE format is extended in units of a serving cell.

Figure 10:
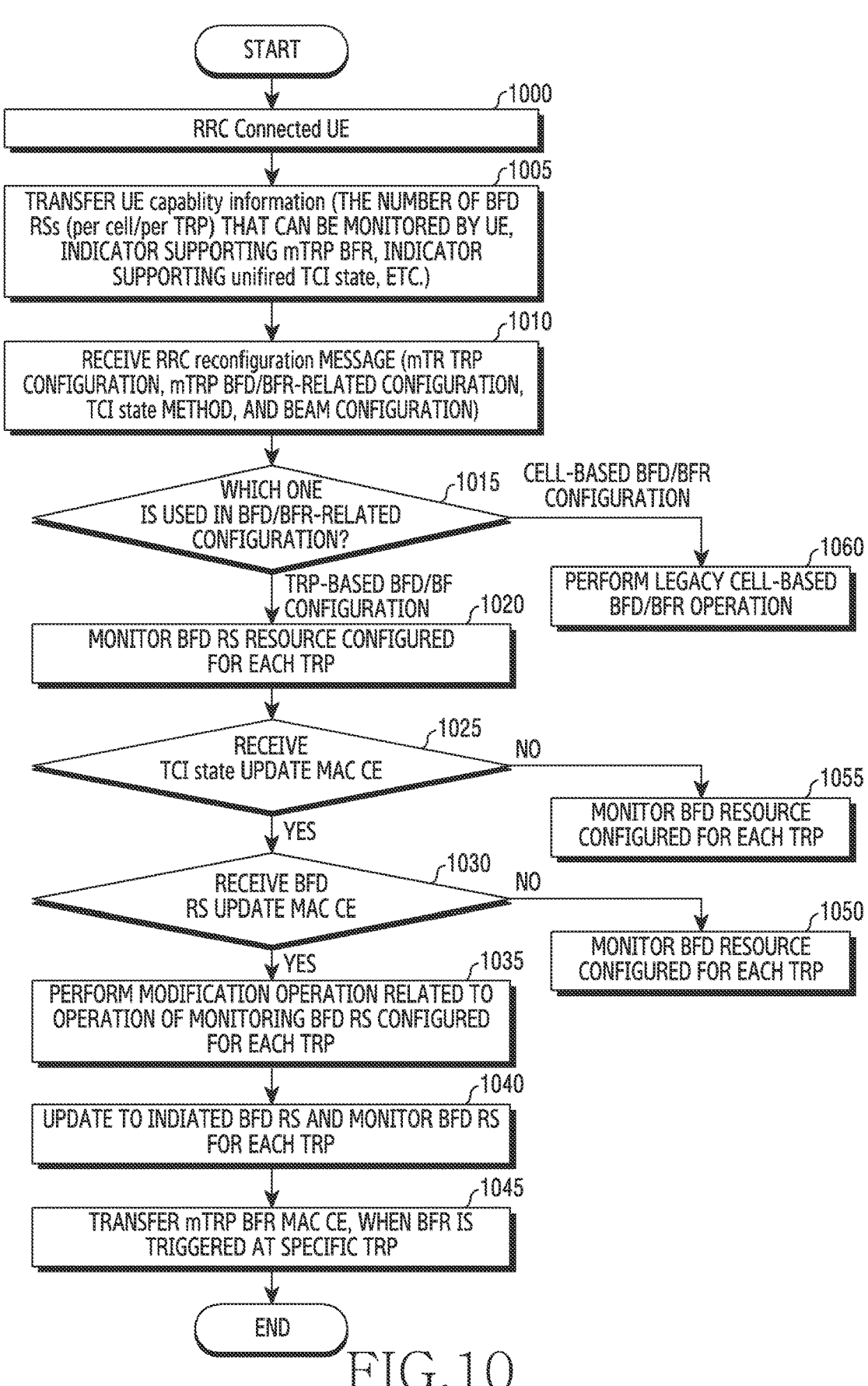
FIG. 10 illustrates an operational flow of a UE for updating a BFD RS according to an embodiment of the disclosure.

FIG. 10 illustrates an operational flow of a UE for updating a BFD RS according to an embodiment of the disclosure.

Referring to operation 1005, the UE in an RRC connected state in operation 1000 may generate UE capability information and transmit it to a BS in response to a UE capability request message of the BS. The UE capability information may include at least one of a capability regarding the number of BFD RSs that can be monitored by the UE for each cell or for each TRP, a BFR capability for a plurality of TRPs, and a capability of supporting a unified TCI state. A UE capability may be indicated by at least one of a capability for each UE, a capability for each band of the UE, and a capability for each band combination of the UE.

Referring to operation 1010, the UE may receive from the BS an RRC reconfiguration message including at least one of CellGroupConfig as a cell group configuration and ServingCellConfig as configuration information for configuring a plurality of serving cells. Configuration information (PDCCH-Config and PDSCH-Config) for reception through the PDCCH and the PDSCH may be included in the RRC message, and a beam configuration for PUCCH resource transmission may be included in the PUCCH-Config. Information on at least one of a BWP configuration (e.g., BWP-Uplink, BWP-Downlink), a CORESET configuration, a scrambling configuration, a TCI state (e.g., TCI-State in PDSCH-Config) configuration, a PUCCH resource, a PUCCH resource set, and spatial relation info may be included in the RRC message. Information on the TCI state related configuration may be provided for each downlink BWP per serving cell, and may be included in the PDCCH-Config and the PDSCH-Config. The PUCCH resource configuration and the beam configuration for resource transmission may also be included in the PUCCH-Config. At least one of the PUCCH resource, the PUCCH resource set, and the spatial relation info may be configured in the PUCCH configuration. According to an embodiment, a plurality of TRPs may be configured, and BFD and BFR related configurations (e.g., RadioLinkMonitoringConfig, beamFailureRecoverySCellConfig, beamFailureRecoveryConfig) for the plurality of configurations may also be included. Details of the configuration are described above with reference to FIG. 7. According to an embodiment, it is different from a configuration for supporting a cell-based BFD/BFR resource (FIG. 6) in that RadioLinkMonitoringConfig and beamFailureRecoverySCellConfig may be configured for the plurality of TRPs since BFD/BFR is managed for each of the plurality of TRPs. In addition, association information for a PUCCH Scheduling Request (SR) associated with the configured BFD RS sets for each TRP may be additionally forwarded. The BS may provide the existing TCI state configuration in association with the TCI state, or may apply a unified TCI state configuration. A unified TCI state may mean a framework for inter-cell beam management, as a method for integrally managing a beam of a plurality of cells, instead of allocating the TCI state on a cell basis. According to various embodiments of the disclosure, a BFD/BFR operation through the plurality of TRPs may be applied to the aforementioned two TCI state frameworks, an index of a beam used in BFD/BFR through the TRP and an indication method may differ, based on the applied configuration.

Referring to operation 1015, the UE may identify whether a resource configuration of BFD is based on a cell or a TRP, in the BFD/BFR-related configuration received in the operation 1010. According to various embodiments of the disclosure, although it is described that it is not possible to simultaneously configure the cell-based BFD RS configuration and the TRP-based BFD RS configuration, the disclosure is not limited thereto.

Referring to operation 1020, when the UE receives the TRP-based BFD RS configuration, the UE may monitor the BFD RS resource configured for each TRP. In this case, an indication or condition for an initial BFD RS resource to be monitored by the UE until the BFD RS update MAC CE for the TRP is received may be specified in the RRC configuration. Although not shown, after the operation 1010, the BS may transfer the BFD RS update MAC CE to the UE, and the UE may receive the MAC CE and apply a related reception operation. A specific operation is described as an operation of receiving the BFD RS update MAC CE in operation 1030. However, without being limited thereto, the operation 1030 may be performed also in the operation 1010 or 1015 together when the BS transfers the MAC CE.

Referring to the operations 1025 and 1030, when the TCI state update MAC CE is received (for example, when a best beam for the UE is changed and thus a beam change is indicated), the UE may receive the BFD RS update MAC CE for the TRP in the operation 1030.

Referring to operation 1035, the UE may perform an operation of modifying a BFD RS monitoring operation configured for each TRP to apply a BFD RS update MAC CE for the received TRP. Specifically, the UE may initialize a BFR-related parameter thereof, i.e., BFI_COUNTER, to 0, or may cancel BFR for an ongoing BFD RS set (Alternatively, the operation of initializing BFI_COUNTER to 0 and canceling the BFR for the ongoing BFD RS set may be applied to the operation of receiving a beam change from the BS in the operation 1025). Since a BFD RS applied to measure BFD for a TRP has been updated, the UE may initialize a BFR procedure for the ongoing BFD RS before MAC CE reception. According to an embodiment of the disclosure, although not shown in FIG. 10, the UE may receive a BFD RS update MAC CE, and may perform signaling for necessity of explicit MAC layer ACK. As a response message for the BFD RS update MAC CE, a confirmation MAC CE operation may be newly introduced, and the UE may report to the BS whether the BFD RS update MAC CE is received through the configuration MAC CE. Upon receiving the confirmation MAC CE, the BS may identify that a BFR MAC CE for a TRP to be reported thereafter by the UE is to be transmitted for BFD RSs to which an update instructed by the BS is applied. When the BFR MAC CE for the TRP is transmitted from the UE in a state where the BS fails to receive the confirmation MAC CE, the BS may identify that information of the BFR MAC CE for the TRP is a report associated with a BFD RS before the BFD RS update MAC CE is applied. However, when the confirmation MAC CE operation is not introduced, the BS may assume that the BFD RS update MAC CE for the TRP has been transmitted to the UE (e.g., an HARQ operation at a PHY layer below a MAC layer may be used to confirm the transfer of the MAC CE), and may identify a BFR MAC for the TRP received thereafter from the UE according to a result of applying the update. The BS may identify a BFR MAC for the TRP received from the UE thereafter according to a result of applying the update. Upon receiving the BFD RS update MAC CE, the UE may apply a Transmission Block (TB) including the MAC CE after an "X" slot from a reception slot. Herein, the "X" slot may be a value defined in a standard, or may be a value given by an RRC configuration or the like. According to various embodiments of the disclosure, the aforementioned value may be given in a symbol or a specific time unit (e.g., ms) in addition to a slot. The aforementioned beam update indication MAC CE and BFD RS update MAC CE may be transferred by being included in one MAC PDU through implementations of the BS.

Referring to operation 1040, the UE may apply a configuration of a resource list for beam failure detection in a TRP level/unit (a list of BFD RS for TRP1 and TRP2), received through an RRC message or an MAC CE. The UE may monitor beam failure detection resources configured for beam failure detection at a specific TRP, for respective TRPs.

Referring to operation 1045, when all BFD RSs monitored for respective TRPs are determined as a beam failure (for example, when the BFD RS indicates a beam failure exceeding beamFailureInstanceMaxCount while beamFailureDetectionTimer is running), the UE may trigger Beam Failure Recovery (BFR) for the TRP. Although not shown in FIG. 10, the UE may transmit a Scheduling Request (SR) to the BS, when an uplink resource for transferring a BFR MAC CE for each TRP is insufficient. The UE may receive a UL grant generated based on the transmitted SR. Referring to operation 1045, if SCell BFR is not triggered but sPCell (PCell or PSCell) BFR is triggered, a random access procedure may be triggered. According to an embodiment of the disclosure, the operation 1045 may be skipped in the presence of the uplink resource used by the UE to transmit the BER MAC CE for each TRP, but the disclosure is not limited thereto. Thereafter, the UE may generate a BFR MAC CE (mTRP BFR MAC CE) including information on BFR of the triggered TRP. The UE may transmit the generated BFR MAC CE to the BS. When the sPCell (PCell or PSCell) BFR is triggered, the UE may transmit the mTRP BFR MAC CE included in msgA (in case of 2 step RACH) or msg3 (in case of 4 step RACH).

Referring to operation 1050, when the UE does not receive the BFD RS update MAC CE for the TRP in operation 1030, the UE may persistently monitor a BFD RS resource configured previously for each TRP.

Referring to operation 1055, when the UE does not receive a TCI state update MAC CE in operation 1025, the UE may persistently monitor the BFD RS resource configured previously for each TRP.

Referring to operation 1060, when the UE receives a cell-based BFD/BFR configuration in operation 1015 (for example, according to an embodiment of the disclosure, a cell-based BFD RS configuration and a TRP-based BFD RS configuration cannot be configured simultaneously, but the disclosure is not limited thereto). The UE may perform the existing cell-based BFD/BFR operation, and this may correspond to the operation disclosed in FIG. 6 and in the existing cell-based BFD/BFR.

Figure 11:
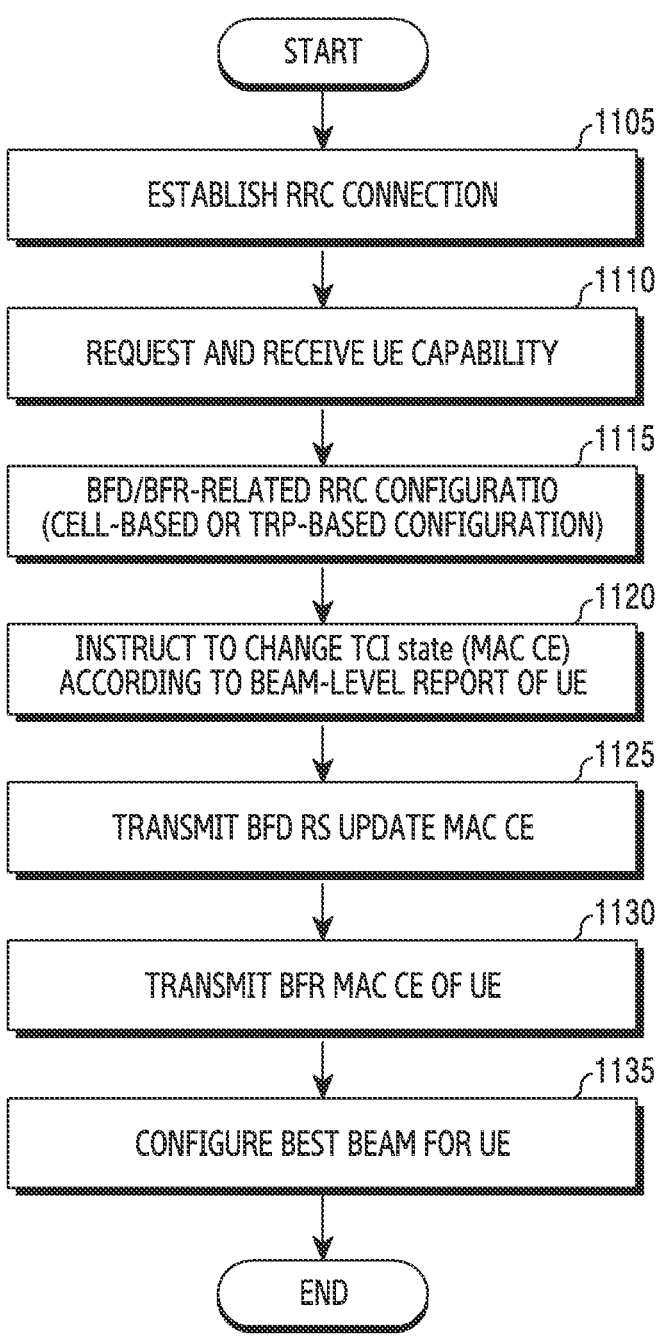
FIG. 11 illustrates an operational flow of a BS for updating a BFD RS according to an embodiment of the disclosure.

FIG. 11 illustrates an operational flow of a BS for updating a BFD RS according to an embodiment of the disclosure.

Referring to operation 1105, the BS may establish an RRC_CONNECTED state with respect to a UE.

Referring to operation 1110, the BS may request for a UE capability, and may receive UE capability information. The BS may analyze the UE capability received in the operation 1110. The BS may determine whether an mTRP of the UE supports a BFD/BFR operation, and may identify how many BFS RS resources can be monitored.

Referring to operation 1115, when the UE identifies the UE capability, the BS may transmit to the UE an RRC reconfiguration message including a cell-based BFD/BFR configuration and TRP-based BFD/BFR configuration. In addition, a message transmitted by the BS may include a cell group configuration (CellGroupConfig) and configuration information (ServingCellConfig) for configuring a plurality of serving cells. The UE may receive an RRC reconfiguration message from the BS. The RRC message may include configuration information (e.g., PDCCH-Config, PDSCH-Config) for reception through a PDCCH and a PDSCH. A beam configuration for PUCCH resource transmission may also be included in the PUCCH-Config. Specifically, the RRC message may include information on at least one of a BWP configuration (BWP-Uplink, BWP-Downlink), a CORESET configuration, a scrambling configuration, a TCI state (TCI-State in PDSCH-Config) configuration, a PUCCH resource, a PUCCH resource set, and spatial relation info. A configuration related to a TCI state may be provided for each downlink BWP per serving cell, and may be included in the PDCCH-Config and the PDSCH-Config. At least one of the PUCCH resource, the PUCCH resource set, and the spatial relation info may be configured in the PUCCH configuration. According to an embodiment, a plurality of TRPs may be configured, and BFD and BFR related configurations (e.g., RadioLinkMonitoringConfig, beamFailureRecoverySCellConfig, beamFailureRecoveryConfig) for the plurality of configurations may also be included. Details of the configuration are described above with reference to FIG. 7. According to an embodiment, it is different from a configuration for supporting a cell-based BFD/BFR resource (FIG. 6) in that RadioLinkMonitoringConfig and beamFailureRecoverySCellConfig may be configured for the plurality of TRPs since BFD/BFR is managed for each of the plurality of TRPs. In addition, association information for a PUCCH Scheduling Request (SR) associated with the configured BFD RS sets for each TRP may be additionally forwarded. The TCI state configuration in association with the TCI state, or may apply a unified TCI state configuration. A unified TCI state may mean a framework for inter-cell beam management, as a method for integrally managing a beam of a plurality of cells, instead of allocating the TCI state on a cell basis. According to various embodiments of the disclosure, a BFD/BFR operation through the plurality of TRPs may be applied to the aforementioned two TCI state frameworks, an index of a beam used in BFD/BFR through the TRP and an indication method may differ, based on the applied configuration.

According to various embodiments of the disclosure, although not shown in FIG. 11, after transmitting the RRC message, the BS may transmit to the UE a BFD RS update MAC CE for the TRP. When a BFD/BFR configuration for the TRP is provided through an RRC configuration, the BFD RS update MAC CE may be present to be transferred, or BFD RS update MAC CE may be transmitted after the RRC configuration or may be omitted through implementations of the BS. A case where the BFD RS update MAC CE is omitted may be a case where information or rules for a BFD RS to be monitored by the UE after receiving an RRC message is provided, when a BFD/BFR configuration for the TRP is provided in an RRC reconfiguration.

Referring to operation 1120, the BS may instruct a TCI state change (e.g., a beam change) through a MAC CE, based on a beam level measurement report value received from the UE.

Referring to operation 1125, the BS may transmit the BFD RS update MAC CE for the TRP, when BFD RSs to be monitored by the UE need to be changed according to a changed beam. Operations 1020 and 1025 may be integrated through implementations of the BS, and thus two MAC CEs may be transferred by being included in one MAC PDU. Although not shown in FIG. 11, after the operation 1025, the BS may receive a confirmation MAC CE from the UE in response to the BFD RS update MAC CE. Upon receiving the confirmation MAC CE, the BS may identify that a BFR MAC CE for the TRP to be reported by the UE is to be transmitted for BFD RSs to which an update instructed by the BS is applied. When the BFR MAC CE for the TRP is transferred from the UE in a state where the BS fails to receive the confirmation MAC CE, the BS may identify that information of the BFR MAC CE for the TRP is a report associated with a BFD RS before the BFD RS update MAC CE is applied. When the confirmation MAC CE operation is not introduced, the BS may assume that the BFD RS update MAC CE for the TRP has been transmitted to the UE (e.g., an HARQ operation at a PHY layer below a MAC layer may be used to confirm the transfer of the MAC CE). The BS may identify a BFR MAC for the TRP received from the UE according to a result of applying the update.

Referring to operation 1130, the BS may receive an mTRP BFR MAC CE from the UE. The BS may confirm that BFR occurs for a specific TRP. The MAC CE may be transmitted during a random access procedure (e.g., BFR in sPCell), or may be transmitted in a connected state through an uplink resource (e.g., SCell BFR).

Referring to operation 1135, based on the mTRP BFR MAC CE received from the UE, the BS may identify whether BFR occurs in a TRP of a specific serving cell or candidate beam information valid for the TRP. The BS may apply the identified information to a best beam change indication.

Figure 12:
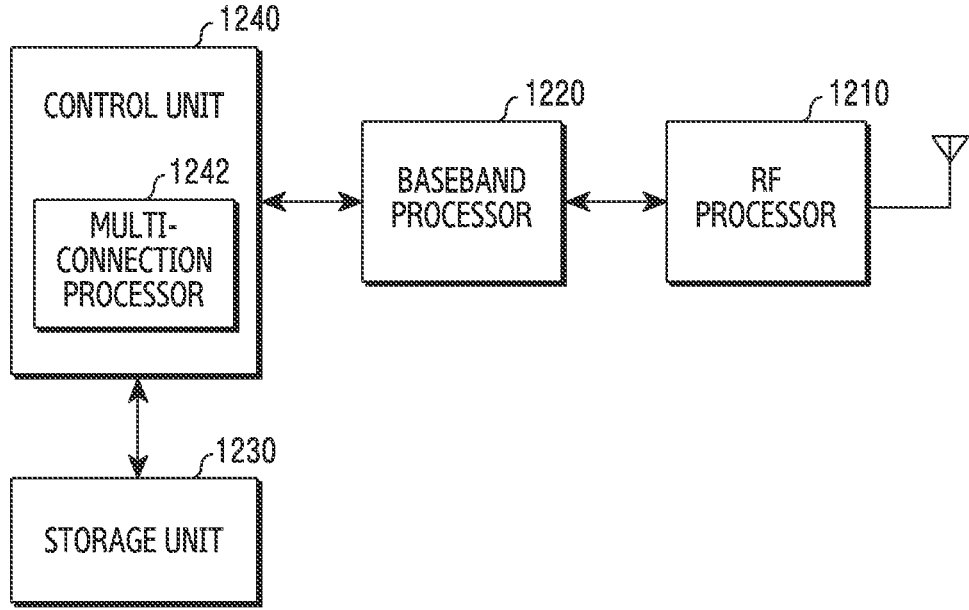
FIG. 12 illustrates a functional configuration of a UE according to an embodiment of the disclosure.

FIG. 12 illustrates a functional configuration of a UE according to an embodiment of the disclosure. FIG. 12 corresponds to the structure of the UE illustrated in FIG. 2B.

Referring to FIG. 12, the UE may include an RF processor 1210, a baseband processor 1220, a storage unit 1230, and a control unit 1240 including a multi-connection processor 1242.

The RF processor 1210 performs a function for transmitting and receiving a signal via a radio channel, such as signal band conversion, amplification, or the like. The RF processor 1210 may up-convert a baseband signal into a Radio Frequency (RF) signal provided from the baseband processor 1220 and then transmit it through an antenna, and may down-convert an RF signal received through the antenna into a baseband signal. For example, the RF processor 1210 may include a transmission filter, a reception filter, an amplifier, a mixer, an oscillator, a Digital to Analog Convertor (DAC), an Analog to Digital Convertor (ADC), or the like. Although only one antenna is illustrated in FIG. 12, the UE may have a plurality of antennas. In addition, the RF processor 1210 may include a plurality of RF chains. Further, the RF processor 1210 may perform beamforming. For the beamforming, the RF processor 1210 may adjust a phase and magnitude of each of signals transmitted and received through a plurality of antennas or antenna elements. In addition, the RF processor 1210 may perform a Multi Input Multi Output (MIMO) operation, and may receive several layers when performing the MIMO operation.

The baseband processor 1220 may perform a conversion function between a baseband signal and a bit-stream according to a physical layer protocol of the system. For example, in data transmission, the baseband processor 1220 may generate complex symbols by coding and modulating a transmission bit-stream. In addition, in data reception, the baseband processor 1220 may restore a reception bit-stream by demodulating and decoding a baseband signal provided from the RF processor 1210. For example, in case of conforming to an Orthogonal Frequency Division Multiplexing (OFDM) scheme, in data transmission, the baseband processor 1220 may generate complex symbols by performing coding and modulation on a transmitted bit-stream, map the complex symbols to subcarriers, and then configure OFDM symbols by performing an Inverse Fast Fourier Transform (IFFT) operation and a Cyclic Prefix (CP) insertion operation. In addition, in data reception, the baseband processor 1220 may split the baseband signal provided from the RF processor 1210 on an OFDM symbol basis, restore signals mapped to the subcarriers by using a Fast Fourier Transform (FFT) operation, and then restore a received bit-stream by performing demodulation and decoding.

The baseband processor 1220 and the RF processor 1210 transmit and receive a signal as described above. Accordingly, the baseband processor 1220 and the RF processor 1210 may be referred to as a transmitter, a receiver, a transceiver, or a communication unit. Further, at least one of the baseband processor 1220 and the RF processor 1210 may include a plurality of communication modules to support a plurality of different radio access technologies. In addition, at least one of the baseband processor 1220 and the RF processor 1210 may include different communication modules to process signals of different frequency bands. For example, the different radio access technologies may include a wireless Local Area Network (LAN) (e.g., IEEE 802.11), a cellular network (e.g., LTE), etc. In addition, the different frequency bands may include a Super High Frequency (SHF) (e.g., 2.NRHz) band and a millimeter (mm) wave (e.g., 60 GHz) band.

The storage unit 1230 stores data such as a basic program, an application program, setup information, or the like for an operation of the UE. In particular, the storage unit 1230 may store information related to a second access node which performs wireless communication by using a second radio access technology. In addition, the storage unit 1230 provides stored data at the request of the control unit 1240.

The control unit 1240 controls overall operations of the UE. For example, the control unit 1240 transmits and receives a signal via the baseband processor 1220 and the RF processor 1210. In addition, the control unit 1240 writes data to the storage unit 1230 and reads the data. For this, the control unit 1240 may include at least one processor. For example, the control unit 1240 may include a Communication Processor (CP) which provides control for communication and an Application Processor (AP) which provides control to a higher layer such as an application program.

Figure 13:
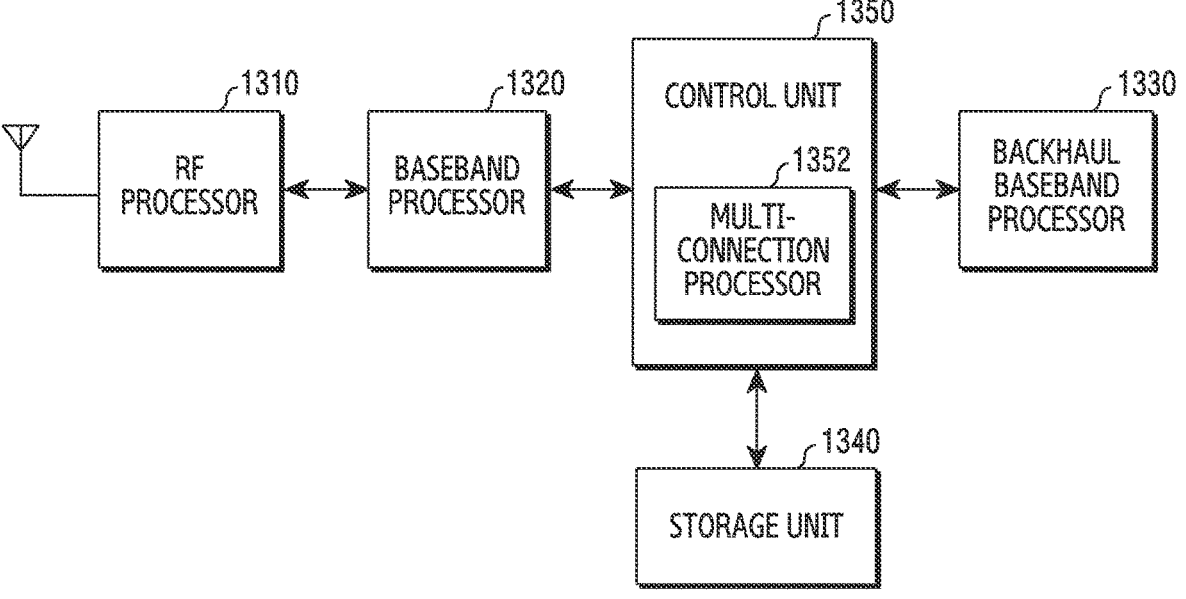
FIG. 13 illustrates a functional configuration of a BS according to an embodiment of the disclosure.

FIG. 13 illustrates a functional configuration of a BS according to an embodiment of the disclosure. FIG. 13 corresponds to the structure of the BS illustrated in FIG. 2A.

Referring to FIG. 13, the BS includes an RF processor 1310, a baseband processor 1320, a backhaul communication unit 1330 (i.e., backhaul baseband processor), a storage unit 1340, and a control unit 1350 including a multi-connection processor 1352.

The RF processor 1310 may perform a function for transmitting and receiving a signal via a radio channel, such as signal band conversion, amplification, or the like. The RF processor 1310 may up-convert a baseband signal into a Radio Frequency (RF) signal provided from the baseband processor 1320 and then transmit it through an antenna, and may down-convert an RF signal received through the antenna into a baseband signal. For example, the RF processor 1310 may include a transmission filter, a reception filter, an amplifier, a mixer, an oscillator, a DAC, an ADC, or the like. Although only one antenna is illustrated in FIG. 13, a first access node may have a plurality of antennas. In addition, the RF processor 1310 may include a plurality of RF chains. Further, the RF processor 1310 may perform beamforming. For the beamforming, the RF processor 1310 may adjust a phase and magnitude of each of signals transmitted and received through a plurality of antennas or antenna elements. The RF processor may perform a downlink MIMO operation by transmitting at least one layer.

The baseband processor 1320 may perform a conversion function between a baseband signal and a bit-stream according to a physical layer protocol of a first radio access technology. For example, in data transmission, the baseband processor 1320 may generate complex symbols by coding and modulating a transmission bit-stream. In addition, in data reception, the baseband processor 1320 may restore a reception bit-stream by demodulating and decoding a baseband signal provided from the RF processor 1310. For example, in case of conforming to an OFDM scheme, in data transmission, the baseband processor 1320 may generate complex symbols by performing coding and modulation on a transmitted bit-stream, map the complex symbols to subcarriers, and then configure OFDM symbols by performing an IFFT operation and a CP insertion operation. In addition, in data reception, the baseband processor 1320 may split the baseband signal provided from the RF processor 1310 on an OFDM symbol basis, restore signals mapped to the subcarriers by using an FFT operation, and then restore a received bit-stream by performing demodulation and decoding. The baseband processor 1320 and the RF processor 1310 may transmit and receive a signal as described above. Accordingly, the baseband processor 1320 and the RF processor 1310 may be referred to as a transmitter, a receiver, a transceiver, or a communication unit.

The backhaul communication unit 1330 may provide an interface for performing communication with other nodes in the network. The backhaul communication unit 1330 may convert a bitstream transmitted from a main BS to another node, i.e., an auxiliary BSs, a core network, or the like, into a physical signal, and may convert the physical signal received from another node into a bitstream.

The storage unit 1340 may store data such as a basic program, an application program, setup information, or the like for an operation of the main BS. In particular, the storage unit 1340 may store information on a bearer assigned to an accessed UE, a measurement result reported from the accessed UE, or the like. In addition, the storage unit 1340 may store information used as a criterion for determining whether to provide or stop multiple connections to the UE. In addition, the storage unit 1340 may provide the stored data at the request of the control unit 1350.

The control unit 1350 may control overall operations of the main BS. For example, the control unit 1350 may transmit and receive a signal via the baseband processor 1320 and the RF processor 1310 or via the backhaul communication unit 1330. In addition, the control unit 1350 may write data to the storage unit 1340 and read the data. For this, the control unit 1350 may include at least one processor.

According to various embodiments of the disclosure, a method performed by a User Equipment (UE) in a wireless communication system may include transmitting UE capability information for Beam Failure Detection (BFD) or Beam Failure Recovery (BFR) to a Base Station (BS), receiving a Radio Resource Control (RRC) reconfiguration message including at least one of configuration information of the BFD and configuration information of the BFR from the BS, based on the transmitted UE capability information, identifying Transmission Reception Point (TRP)-based resource configuration information by configuring a resource for the BFD, based on the received RRC reconfiguration message, monitoring the BFD resource configured for each TRP, based on the identified configuration information, and transmitting information on the BFR to the BS, based on the monitoring result.

According to an embodiment, the RRC reconfiguration message may include at least one of cell group configuration information, configuration information for determining a serving cell, Transmission Configuration Indicator (TCI) state configuration information, and information on a Physical Uplink Control Channel (PUCCH) resource.

According to an embodiment, the method may further include receiving a Medium Access Control (MAC) Control Element (CE) including at least one of information on TCI state update and information on BFD resource update from the BS, and updating the BFD resource monitoring operation and configuring BFD resources, based on the received MAC CE.

According to an embodiment, the method may further include transmitting to the BS a confirmation MAC CE indicating whether information on the BFD resource update is received.

According to an embodiment, the MAC CE may further include information on a Physical Uplink Control Channel (PUCCH)-Scheduling Request (SR) configuration related to the information on BFD resource update.

According to various embodiments of the disclosure, a method performed by a BS in a wireless communication system may include receiving UE capability information for BFD or BFR from a UE, transmitting an RRC reconfiguration message including at least one of configuration information of the BFD and configuration information of the BFR from the BS, based on the received UE capability information, receiving information on the BFR, based on a monitoring result based on the RRC reconfiguration message, from the UE, and identifying a beam change for the UE, based on the received information on the BFR.

According to an embodiment, the RRC reconfiguration message may include at least one of cell group configuration information, configuration information for determining a serving cell, TCI state configuration information, and information on a PUCCH resource.

According to an embodiment, the method may further include transmitting MAC CE including at least one of information on TCI state update and information on BFD resource update to the UE.

According to an embodiment, the method may further include receiving from the UE a confirmation MAC CE indicating whether information on the BFD resource update is received.

According to an embodiment, the MAC CE may further include information on a PUCCH-SR configuration related to the information on BFD resource update.

According to various embodiments of the disclosure, a UE in a wireless communication system may include at least one transceiver and at least one processor operatively coupled to the at least one transceiver. The at least one processor may be configured to transmit UE capability information for BFD or BFR to a BS, receive an RRC reconfiguration message including at least one of configuration information of the BFD and configuration information of the BFR from the BS, based on the transmitted UE capability information, identify TRP-based resource configuration information by configuring a resource for the BFD, based on the received RRC reconfiguration message, monitor the BFD resource configured for each TRP, based on the identified configuration information, and transmit information on the BFR to the BS, based on the monitoring result.

According to an embodiment, the RRC reconfiguration message may include at least one of cell group configuration information, configuration information for determining a serving cell, TCI state configuration information, and information on a PUCCH resource.

According to an embodiment, the at least one processor may be further configured to receive a MAC CE including at least one of information on TCI state update and information on BFD resource update from the BS, and update the BFD resource monitoring operation and configure BFD resources, based on the received MAC CE.

According to an embodiment, the at least one processor may be further configured to transmit to the BS a confirmation MAC CE indicating whether information on the BFD resource update is received.

According to an embodiment, the MAC CE may further include information on a PUCCH-SR configuration related to the information on BFD resource update.

According to various embodiments of the disclosure, a BS in a wireless communication system may include at least one transceiver and at least one processor operatively coupled to the at least one transceiver. The at least one processor may be configured to receive UE capability information for BFD or BFR from a UE, transmit an RRC reconfiguration message including at least one of configuration information of the BFD and configuration information of the BFR from the BS, based on the received UE capability information, receive information on the BFR, based on a monitoring result based on the RRC reconfiguration message, from the UE, and identify a beam change for the UE, based on the received information on the BFR.

According to an embodiment, the RRC reconfiguration message may include at least one of cell group configuration information, configuration information for determining a serving cell, TCI state configuration information, and information on a PUCCH resource.

According to an embodiment, the at least one processor may be further configured to transmit MAC CE including at least one of information on TCI state update and information on BFD resource update to the UE.

According to an embodiment, the at least one processor may be further configured to receive from the UE a confirmation MAC CE indicating whether information on the BFD resource update is received.

According to an embodiment, the MAC CE may further include information on a PUCCH-SR configuration related to the information on BFD resource update.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user equipment (UE) in a wireless communication system, the UE comprising:
   a transceiver; and
   a controller coupled to the transceiver, and configured to:
      receive, from a base station (BS), a first radio resource control (RRC) message configuring a first beam failure detection-reference signal (BFD-RS) set and a second BFD-RS set, wherein each of the first BFD-RS set and the second BFD-RS set includes a plurality of BFD-RS resources, and
      receive, from the BS, a medium access control (MAC) control element (CE)
      for activating or deactivating one or more BFD-RS resources among the plurality of BFD-RS resources,
   wherein the MAC CE includes a first BFD-RS identifier (ID) indicating a first BFD-RS resource from the first BFD-RS set and a second BFD-RS ID indicating a second BFD-RS resource from the second BFD-RS set,
   wherein the MAC CE further includes a 1-bit indicator indicating whether the MAC CE further includes a third BFD-RS ID indicating a third resource from the first BFD-RS set or the second BFD-RS set, and
   wherein the first BFD-RS set is associated with a first cell identity and the second BFD-RS set is associated with a second cell identity different from the first cell identity.

2. The UE of claim 1,
   wherein the controller is further configured to transmit, to the BS, capability information indicating whether the UE supports BFD for multi transmission reception points (TRPs), and
   wherein the capability information includes information indicating a maximum number of BFD-RS resource per BFD-RS set supported by the UE.

3. The UE of claim 1, wherein each BFD-RS resource among the plurality of BFD-RS resources corresponds to a synchronization signal block (SSB) index or channel state information-reference signal (CSI-RS) index.

4. The UE of claim 1, wherein the controller is further configured to receive, from the BS, a second RRC message configuring at least one candidate beam RS list associated with the first BFD-RS set or the second BFD-RS set.

5. A base station (BS) in a wireless communication system, the BS comprising:
   a transceiver; and
   a controller coupled to the transceiver, and configured to:
      transmit, to a user equipment (UE), a first radio resource control (RRC) message configuring a first beam failure detection-reference signal (BFD-RS) set and a second BFD-RS set, wherein each of the first BFD-RS set and the second BFD-RS set includes a plurality of BFD-RS resources, and
      transmit, to the UE, a medium access control (MAC) control element (CE)
      for activating or deactivating one or more BFD-RS resources among the plurality of BFD-RS resources,
   wherein the MAC CE includes a first BFD-RS identifier (ID) indicating a first BFD-RS resource from the first BFD-RS set and a second BFD-RS ID indicating a second BFD-RS resource from the second BFD-RS set, wherein the MAC CE further includes a 1-bit indicator indicating whether the MAC CE further includes a third BFD-RS ID indicating a third resource from the first BFD-RS set or the second BFD-RS set, and wherein the first BFD-RS set is associated with a first cell identity and the second BFD-RS set is associated with a second cell identity different from the first cell identity.

6. The BS of claim 5, wherein the controller is further configured to receive, from the UE, capability information indicating whether the UE supports BFD for multi transmission reception points (TRPs), and wherein the capability information includes information indicating a maximum number of BFD-RS resource per BFD-RS set supported by the UE.

7. The BS of claim 5, wherein each BFD-RS resource among the plurality of BFD-RS resources corresponds to a synchronization signal block (SSB) index or channel state information-reference signal (CSI-RS) index.

8. The BS of claim 5, wherein the controller is further configured to transmit, to the UE, a second RRC message configuring at least one candidate beam RS list associated with the first BFD-RS set or the second BFD-RS set.

9. A method performed by a user equipment (UE) in a wireless communication system, the method comprising:

receiving, from a base station (BS), a first radio resource control (RRC) message configuring a first beam failure detection-reference signal (BFD-RS) set and a second BFD-RS set, wherein each of the first BFD-RS set and the second BFD-RS set includes a plurality of BFD-RS resources; and receiving, from the BS, a medium access control (MAC) control element (CE)

for activating or deactivating one or more BFD-RS resources among the plurality of BFD-RS resources, wherein the MAC CE includes a first BFD-RS identifier (ID) indicating a first BFD-RS resource from the first BFD-RS set and a second BFD-RS ID indicating a second BFD-RS resource from the second BFD-RS set, wherein the MAC CE further includes a 1-bit indicator indicating whether the MAC CE further includes a third BFD-RS ID indicating a third resource from the first BFD-RS set or the second BFD-RS set, and wherein the first BFD-RS set is associated with a first cell identity and the second BFD-RS set is associated with a second cell identity different from the first cell identity.

10. The method of claim 9, further comprising:

transmitting, to the BS, capability information indicating whether the UE supports BFD for multi transmission reception points (TRPs), wherein the capability information includes information indicating a maximum number of BFD-RS resource per BFD-RS set supported by the UE, and wherein each BFD-RS resource among the plurality of BFD-RS resources corresponds to a synchronization signal block (SSB) index or channel state information-reference signal (CSI-RS) index.

11. The method of claim 9, further comprising:

receiving, from the BS, a second RRC message configuring at least one candidate beam RS list associated with the first BFD-RS set or the second BFD-RS set.

12. A method performed by a base station (BS) in a wireless communication system, the method comprising:

transmitting, to a user equipment (UE), a first radio resource control (RRC) message configuring a first beam failure detection-reference signal (BFD-RS) set and a second BFD-RS set, wherein each of the first BFD-RS set and the second BFD-RS set includes a plurality of BFD-RS resources; and transmitting, to the UE, a medium access control (MAC) control element (CE)

for activating or deactivating one or more BFD-RS resources among the plurality of BFD-RS resources, wherein the MAC CE includes a first BFD-RS identifier (ID) indicating a first BFD-RS resource from the first BFD-RS set and a second BFD-RS ID indicating a second BFD-RS resource from the second BFD-RS set, wherein the MAC CE further includes a 1-bit indicator indicating whether the MAC CE further includes a third BFD-RS ID indicating a third resource from the first BFD-RS set or the second BFD-RS set, and wherein the first BFD-RS set is associated with a first cell identity and the second BFD-RS set is associated with a second cell identity different from the first cell identity.

13. The method of claim 12, further comprising:

receiving, from the UE, capability information indicating whether the UE supports BFD for multi transmission reception points (TRPs), wherein the capability information includes information indicating a maximum number of BFD-RS resource per BFD-RS set supported by the UE, and wherein each BFD-RS resource among the plurality of BFD-RS resources corresponds to a synchronization signal block (SSB) index or channel state information-reference signal (CSI-RS) index.

14. The method of claim 12, further comprising:

transmitting, to the UE, a second RRC message configuring at least one candidate beam RS list associated with the first BFD-RS set or the second BFD-RS set.

* * * * *